US012110714B1

(12) United States Patent
Situ

(10) Patent No.: US 12,110,714 B1
(45) Date of Patent: Oct. 8, 2024

(54) DOOR LOCK

(71) Applicants: Shenzhen Bida Technology Co., Ltd., Shenzhen (CN); Shenzhen Condensation Technology Co., Ltd., Shenzhen (CN)

(72) Inventor: Jianbo Situ, Yangjiang (CN)

(*) Notice: Subject to any disclaimer, the term of this patent is extended or adjusted under 35 U.S.C. 154(b) by 0 days.

(21) Appl. No.: 18/398,898

(22) Filed: Dec. 28, 2023

(51) Int. Cl.
*E05B 47/00* (2006.01)

(52) U.S. Cl.
CPC .... *E05B 47/0012* (2013.01); *E05B 2047/002* (2013.01); *E05B 2047/0026* (2013.01); *E05B 2047/0067* (2013.01); *E05B 2047/0084* (2013.01); *E05B 2047/0094* (2013.01)

(58) Field of Classification Search
CPC ................. E05B 47/00; E05B 47/0012; E05B 2047/002; E05B 2047/0026; E05B 2047/0067; E05B 2047/0084; E05B 2047/0094
USPC ........................................................ 70/279.1
See application file for complete search history.

(56) References Cited

U.S. PATENT DOCUMENTS 6,145,353 A * 11/2000 Doucet ............... E05B 47/0692 70/277
2005/0050928 A1* 3/2005 Frolov .................. E05B 47/068 70/277
2023/0220701 A1* 7/2023 Mohammed .............. E05B 3/06

FOREIGN PATENT DOCUMENTS

| | | | | | |
|---|---|---|---|---|---|
| CN | 103184813 | A | * | 7/2013 | B22F 1/0059 |
| EP | 4068228 | A1 | * | 10/2022 | E05B 17/0062 |
| GB | 2568730 | A | * | 5/2019 | E05B 47/0012 |
| WO | WO-03058013 | A1 | * | 7/2003 | E05B 47/0673 |
| WO | WO-2011022855 | A1 | * | 3/2011 | E05B 47/0649 |
| WO | WO-2017114534 | A1 | * | 7/2017 | E05B 47/0012 |

* cited by examiner

*Primary Examiner* — Suzanne L Barrett
(74) *Attorney, Agent, or Firm* — Sam Pierce

(57) ABSTRACT

Disclosed is a lock, including a first transmission assembly, a second transmission assembly, a spindle, and a dead bolt. The second transmission assembly includes a first gear, and the spindle is connected to the first gear and the dead bolt. The first transmission assembly includes a second gear, a third gear, and a connector, the connector connects the second gear to the third gear, and the second gear is in meshed connection with the third gear. The third gear has a first position, a second position, and a third position in respect to the first gear.

18 Claims, 21 Drawing Sheets

DOOR LOCK

FIELD OF TECHNOLOGY

This application relates to the technical field of locks, in particular to a lock.

BACKGROUND

At present, in addition to password, fingerprint, card swiping, Bluetooth or APP wireless unlocking, a smart door lock is generally provided with a mechanical key that is inserted into a keyhole and then rotated to open the lock.

When a user uses the mechanical key or turns a knob in a door to open the lock, if a transmission assembly in the smart door lock is still in a state of transmission connection, the action of key or knob unlocking will be resisted, thus affecting the user experience; and if the door lock is forcibly opened, there will also be an influence on the transmission assembly or a motor, thereby affecting the service life of the transmission assembly or the motor, and even damaging the transmission assembly or the motor.

In addition, when the mechanical transmission assembly of a lock body is jammed or the door is deformed to cause a dead bolt to be unable to extend or retract normally, if the motor executes the action of unlocking or locking, the jamming of the transmission assembly or the sticking of the dead bolt will impact the transmission assembly or the motor, thereby affecting the service life of the transmission assembly or the motor, and even damaging the transmission assembly or the motor.

SUMMARY

In view of the above situation, it is necessary to provide a lock, which endows transmission assemblies with a clutch protection function, improves the usage experience of a user, and prolongs the service life of a motor.

An embodiment of this application provides a lock, including a first transmission assembly, a second transmission assembly, a spindle, and a dead bolt. The second transmission assembly includes a first gear arranged rotatably, and the spindle is connected to the first gear and the dead bolt. The first transmission assembly includes a clutch assembly, the clutch assembly includes a second gear, a third gear, and a connector, the connector connects the second gear to the third gear, and the second gear is in meshed connection with the third gear. The motor is connected to the second gear and configured to drive the second gear to rotate, and the second gear is configured to drive the third gear to rotate. The third gear has a first position, a second position, and a third position in respect to the first gear. When the third gear is in the first position, the third gear is in meshed connection with the first gear, the third gear is configured to drive the first gear to rotate along a first direction, the first gear drives the spindle to rotate, and the spindle drives the dead bolt to move and retract. When the third gear is in the second position, the third gear is separated from the first gear. When the third gear is in the third position, the third gear is in meshed connection with the first gear, the third gear is configured to drive the first gear to rotate along a second direction, the first gear drives the spindle to rotate, and the spindle drives the dead bolt to move and extend, where the second direction is opposite to the first direction.

In the lock, the clutch assembly of the first transmission assembly has three states, which are corresponding states when the third gear is in the first position, the second position, and the third position, respectively; when the third gear is in the first or third position, the first transmission assembly and the second transmission assembly are in a state of transmission connection, and the dead bolt is caused to retract or extend through transmission, to implement unlocking or locking; and when the third gear is in the second position, the first transmission assembly and the second transmission assembly are in a state of no transmission connection, which can protect the motor, prolong the service life of the motor, and reduce the impact of the service life of the motor on the lock; moreover, the clutch assembly is simple and reliable in structure and convenient to assemble and maintain.

In some embodiments of this application, the clutch assembly further includes a first shaft connected to the third gear and the connector, and the third gear is configured to rotate about an axis of the first shaft.

In some embodiments of this application, the first shaft includes a flange, and the flange is located on one side of the third gear that faces away from the connector and connected to the third gear; and the clutch assembly further comprises a first elastic element arranged between the connector and the third gear and connected to the connector and the third gear.

In some embodiments of this application, the first shaft includes an excess part located on one side of the connector that faces away from the third gear; and the first transmission assembly further includes a first limit element connected to the excess part and the connector.

In some embodiments of this application, the third gear is configured to drive the first shaft to rotate synchronously.

In some embodiments of this application, the first shaft is fixedly connected to the connector.

In some embodiments of this application, the clutch assembly further includes a second shaft connected to the second gear and the connector, and the second gear is configured to rotate about an axis of the second shaft.

In some embodiments of this application, the second transmission assembly includes a fourth gear, guards, and second elastic elements. The fourth gear is arranged rotatably and connected to the first gear and is provided with a first groove and second grooves, the first groove is concavely arranged along an axial direction of the fourth gear, and the second grooves communicate with the first groove and are concavely arranged along a diameter direction of the fourth gear and a direction away from an axis of the fourth gear, where the axial direction of the fourth gear coincides with an axial direction of the spindle. The guards are arranged in the first groove and connected to the spindle and the fourth gear, and each of the guards includes a bulge arranged in a manner of extending along the diameter direction of the fourth gear and the direction away from the axis of the fourth gear. The second elastic elements are connected to the guards. The guards have a first state and a second state in respect to the fourth gear. When the guards are in the first state, the bulges are located in the second grooves, and the fourth gear, the guards, and the spindle are configured to rotate about the axis of the fourth gear. When the guards are in the second state, the bulges are separated from the second grooves and connected to a side wall of the first groove, the second elastic elements are in a compressed deformation state, and the guards and the spindle are configured to rotate relative to the fourth gear.

In some embodiments of this application, the fourth gear is provided with the plurality of second grooves arranged along a circumferential direction of the fourth gear; and the second transmission assembly includes the two guards and the two second elastic elements, the two guards are symmetrically arranged with the axis of the fourth gear as a center, each of the two second elastic elements is connected to the two guards, and the two second elastic elements are symmetrically arranged with the axis of the fourth gear as the center.

In some embodiments of this application, each of the guards further includes a base, the bulge is arranged on the base, and the bases are connected to the second elastic elements; the second transmission assembly further includes a second limit element, and the second limit element includes a first part and second parts connected to each other; the bases are located between the first part and a bottom wall of the first groove along the axial direction of the fourth gear; and the second parts are located between the bases and the side wall of the first groove along the diameter direction of the fourth gear.

In some embodiments of this application, the second limit element includes the plurality of second parts arranged along the circumferential direction of the fourth gear, and a gap is provided between adjacent two of the plurality of second parts; and at least part of the bulge is located in the gap.

In some embodiments of this application, the second limit element further includes guide parts arranged at the first part and connected to the guards.

In some embodiments of this application, the second limit element is provided with a first through hole; and the spindle includes a first limit part located in the first through hole and connected to a side wall of the first through hole, and the first limit part and the first through hole are configured to cause the spindle and the second limit element to rotate synchronously.

In some embodiments of this application, the second limit element further includes a detection part arranged at the first part; and the lock further includes a sensor configured to monitor an angular position of the detection part.

In some embodiments of this application, the lock further includes a knob and a lock cylinder assembly. The knob is connected to the spindle and configured to drive the spindle to rotate. The lock cylinder assembly is connected to the spindle and configured to be inserted with a key and drive the spindle to rotate. The lock cylinder assembly and the knob are located at two ends of the lock respectively along the axial direction of the spindle.

In some embodiments of this application, the lock further includes a circuit board and a password assembly, and the circuit board is connected to the motor and the password assembly and is configured to control the motor.

In some embodiments of this application, the lock further includes a fingerprint assembly connected to the circuit board.

In some embodiments of this application, the lock further includes a card swiping assembly connected to the circuit board.

In some embodiments of this application, the lock further includes a Bluetooth assembly connected to the circuit board.

In some embodiments of this application, the lock further includes a communication assembly connected to the circuit board.

In summary, according to the lock in this application, the clutch assembly of the first transmission assembly has three states, which are corresponding states when the third gear is in the first position, the second position, and the third position, respectively; when the third gear is in the first or third position, the first transmission assembly and the second transmission assembly are in the state of transmission connection, and the dead bolt is caused to retract or extend through the transmission, to implement unlocking or locking; and when the third gear is in the second position, the first transmission assembly and the second transmission assembly are in the state of no transmission connection. In this way, through a clutch function of the clutch assembly, the third gear is caused to be in the second position. When a user uses a mechanical key or turns a knob in a door to open the lock, the turning action of the user does not need to overcome a resistance force generated by the motor and gear meshing, which can protect the motor, prolong the service life of the motor, reduce the impact of the service life of the motor on the lock, facilitate the user to open the lock smoothly, and improve the usage experience of the user.

Moreover, based on the first state and the second state of the guards in the second transmission assembly, the spindle and the second transmission assembly can be in the state of transmission connection or no transmission connection. When the dead bolt cannot extend or retract normally due to unexpected factors and becomes stuck, or the transmission assembly becomes jammed or even stuck, the bulges of the guards in the second transmission assembly can move from the second grooves to the first groove, such that the spindle and the second transmission assembly are in the state of no transmission connection, and a torque continuously output by the motor and the spindle are in the state of no transmission connection, which helps to protect the motor and the transmission assembly, prolong the service life of the motor and the transmission assembly, and reduce the impact of the service life of the motor and the transmission assembly on the lock.

Figure 1:
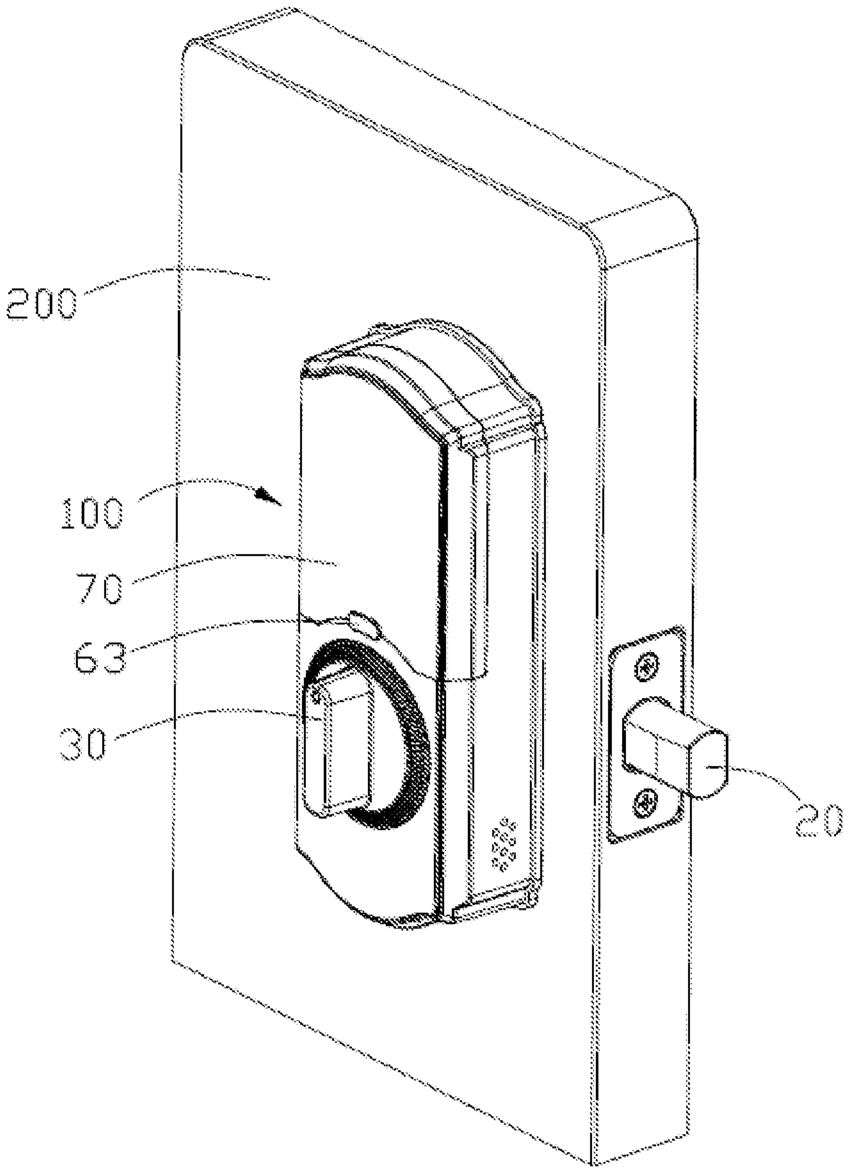
FIG. 1 is a schematic diagram of a lock mounted on a door, in the door, in one embodiment of this application.

| In reference numerals: | |
|---|---|
| Lock | 100 |
| Power device | 10 |
| First transmission assembly | 11 |
| Clutch assembly | 111 |
| Second gear | 1111 |
| Third gear | 1112 |
| Connector | 1113 |
| First shaft | 1114 |
| Flange | 11141 |
| Excess part | 11142 |
| First elastic element | 1115 |
| First limit element | 1116 |
| Second shaft | 1117 |
| Fifth gear | 112 |
| First tooth part | 1121 |
| Second tooth part | 1122 |
| Second transmission assembly | 12 |
| First gear | 121 |
| Fourth gear | 122 |
| First groove | 1221 |
| Second groove | 1222 |
| Second limit part | 1223 |
| Guard | 123 |
| Bulge | 1231 |
| Limit slot | 1232 |
| Base | 1233 |
| Second elastic element | 124 |
| Second limit element | 125 |
| First part | 1251 |
| Second part | 1252 |
| Gap | 1253 |
| Guide part | 1254 |
| First through hole | 1255 |
| Second bulge | 1256 |
| Detection part | 1257 |
| Third limit element | 126 |
| Magnetic element | 127 |
| Motor | 13 |
| Worm | 131 |
| Spindle | 14 |
| First limit part | 141 |
| First housing | 15 |
| Second through hole | 151 |
| Third through hole | 152 |
| Dead bolt | 20 |
| Knob | 30 |
| Lock cylinder assembly | 40 |
| Circuit board | 50 |
| First sensor | 51 |
| Second sensor | 52 |

-continued

| In reference numerals: | |
|---|---|
| Password assembly | 61 |
| First button | 611 |
| Fingerprint assembly | 62 |
| Second button | 63 |
| Card swiping assembly | 64 |
| Second housing | 70 |
| Battery assembly | 80 |
| Door | 200 |

The following specific embodiments will be combined with the above accompanying drawings to further describe this application.

DESCRIPTION OF THE EMBODIMENTS

The technical solutions in the embodiments of this application will be described below with reference to the accompanying drawings in the embodiments of this application. Apparently, the described embodiments are merely some rather than all of the embodiments of this application.

It should be noted that when one element is regarded to be "connected to" another element, it may be directly connected to another element or there may be a centered element simultaneously. When one element is regarded to be "arranged" on another element, it may be directly arranged on another element or there may be a centered element simultaneously. In this application, unless otherwise explicitly specified and defined, the terms "mounted", "connected", "connection", "fixed", etc. should be understood in a broad sense, for example, it may be a fixed connection, a detachable connection, or an integrated connection; it may be a mechanical connection or an electrical connection; and it may be being directly connected, being indirectly connected via an intermediate medium, or communication between interiors of two elements. Those of ordinary skill in the art may understand specific meanings of the above terms in this application according to specific circumstances. The term "and/or" used herein includes any and all combinations of one or more related listed items.

All technical and scientific terms used herein have the same meaning as commonly understood by those skilled in the art of this application, unless otherwise defined. The terms used in the specification of this application are only used for describing specific embodiments, and are not intended to limit this application.

In the description of the embodiments of this application, the technical terms such as "first" and "second" are only used for distinguishing different objects, and cannot be construed as indicating or implying relative importance or implying a number, a particular order, or a primary and secondary relation of the indicated technical features. In the description of the embodiments of this application, "a plurality of" means two or more, unless otherwise expressly and specifically defined.

Reference herein to the "embodiments" means that specific features, structures or characteristics described with reference to the embodiments may be included in at least one embodiment of this application. The occurrence of "embodiment" in various positions in the specification does not necessarily refer to the same embodiment, nor is it a separate or alternative embodiment that is mutually exclusive to other embodiments. The embodiments in this application may be combined with each other under no conflict.

It should be noted that the thicknesses, lengths, widths, and other dimensions of various components in the embodiments of this application shown in the accompanying drawings and the overall thickness, length, width, and other dimensions of an integrated device are illustrative only and should not constitute any limitation to this application.

An embodiment of this application provides a lock, including a first transmission assembly, a second transmission assembly, a spindle, and a dead bolt. The second transmission assembly includes a first gear arranged rotatably, and the spindle is connected to the first gear and the dead bolt. The first transmission assembly includes a clutch assembly, the clutch assembly includes a second gear, a third gear, and a connector, the connector connects the second gear to the third gear, and the second gear is in meshed connection with the third gear. The motor is connected to the second gear and configured to drive the second gear to rotate, and the second gear is configured to drive the third gear to rotate. The third gear has a first position, a second position, and a third position in respect to the first gear. When the third gear is in the first position, the third gear is in meshed connection with the first gear, the third gear is configured to drive the first gear to rotate along a first direction, the first gear drives the spindle to rotate, and the spindle drives the dead bolt to move and retract. When the third gear is in the second position, the third gear is separated from the first gear. When the third gear is in the third position, the third gear is in meshed connection with the first gear, the third gear is configured to drive the first gear to rotate along a second direction, the first gear drives the spindle to rotate, and the spindle drives the dead bolt to move and extend, where the second direction is opposite to the first direction.

In the lock, the clutch assembly of the first transmission assembly has three states, which are corresponding states when the third gear is in the first position, the second position, and the third position, respectively; when the third gear is in the first or third position, the first transmission assembly and the second transmission assembly are in a state of transmission connection, and the dead bolt is caused to retract or extend through transmission, to implement unlocking or locking; and when the third gear is in the second position, the first transmission assembly and the second transmission assembly are in a state of no transmission connection. In this way, through a clutch function of the clutch assembly, the third gear is caused to be in the second position. When a user uses a mechanical key or turns a knob in a door to open the lock, the turning action of the user does not need to overcome a resistance force generated by the motor and gear meshing, which can protect the motor, prolong the service life of the motor, reduce the impact of the service life of the motor on the lock, facilitate the user to open the lock smoothly, and improve the usage experience of the user.

The embodiment of this application is further described below in conjunction with the accompanying drawings.

As shown in FIG. 1 to FIG. 4, an embodiment of this application provides a lock 100. The lock 100 may be applied to a smart door lock.

The lock 100 includes a power device 10 and a dead bolt 20. The power device 10 is connected to the dead bolt 20 and configured to drive the dead bolt 20 to retract or extend, so as to open or close the lock 100.

In an embodiment, the power device 10 includes a first transmission assembly 11, a second transmission assembly 12, a motor 13, and a spindle 14, the second transmission assembly 12 includes a first gear 121 arranged rotatably, and the spindle 14 is connected to the first gear 121 and the dead bolt 20. The first gear 121 can drive the spindle 14 to rotate, and then the spindle 14 causes the dead bolt 20 to retract or extend, so as to open or close the lock.

As shown in FIG. 4 to FIG. 7, the first transmission assembly 11 includes a clutch assembly 111 connected to the motor 13, and there are two states of transmission connection and no transmission connection between the clutch component 111 and the first gear 121. When the clutch assembly 111 and the first gear 121 are in the state of transmission connection, the motor 13 can cause the dead bolt 20 to retract or extend through transmission of the first transmission assembly 11 and the second transmission assembly 12. When the clutch component 111 and the first gear 121 are in the state of no connection, it helps to reduce the impact of transmission of a second gear 1111 on the motor 13 and prolong the service life of the motor 13.

The clutch assembly 111 includes a second gear 1111, a third gear 1112, and a connector 1113, the connector 1113 connects the second gear 1111 to the third gear 1112, and the second gear 1111 is in meshed connection with the third gear 1112.

The motor 13 is connected to the second gear 1111 and configured to drive the second gear 1111 to rotate, and the second gear 1111 is configured to drive the third gear 1112 to rotate.

The third gear 1112 has a first position, a second position, and a third position in respect to the first gear 121.

Figure 5:
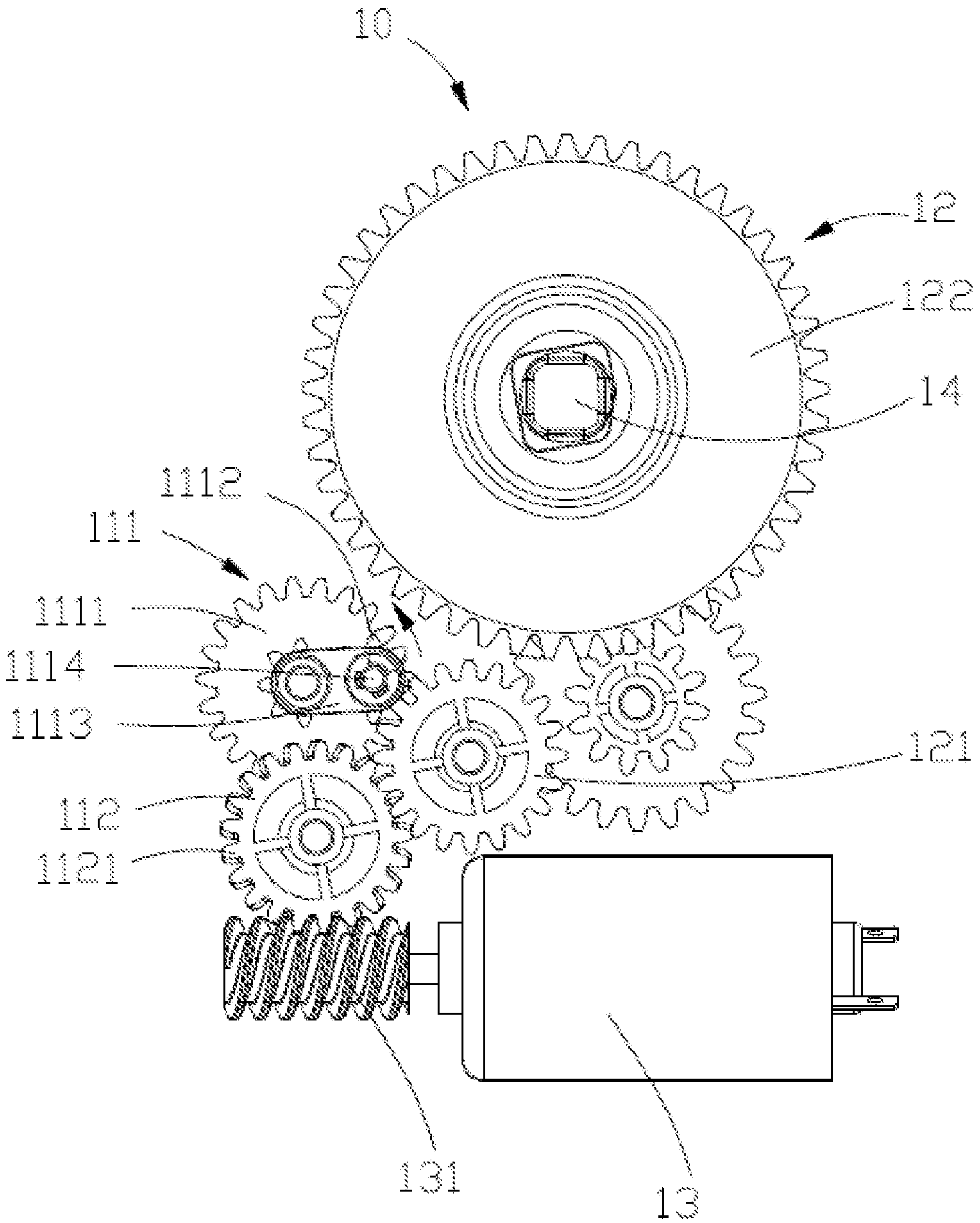
FIG. 5 is a schematic diagram of an internal structure of a power device in a state that a third gear is in a first position in one embodiment of this application.

When the third gear 1112 is in the first position, as shown in FIG. 5, the third gear 1112 is in meshed connection with the first gear 121, the third gear 1112 is configured to drive the first gear 121 to rotate along a first direction, the first gear 121 drives the spindle 14 to rotate, and the spindle 14 drives the dead bolt 20 to move and retract. This is a lock opening process of the lock 100.

Figure 6:
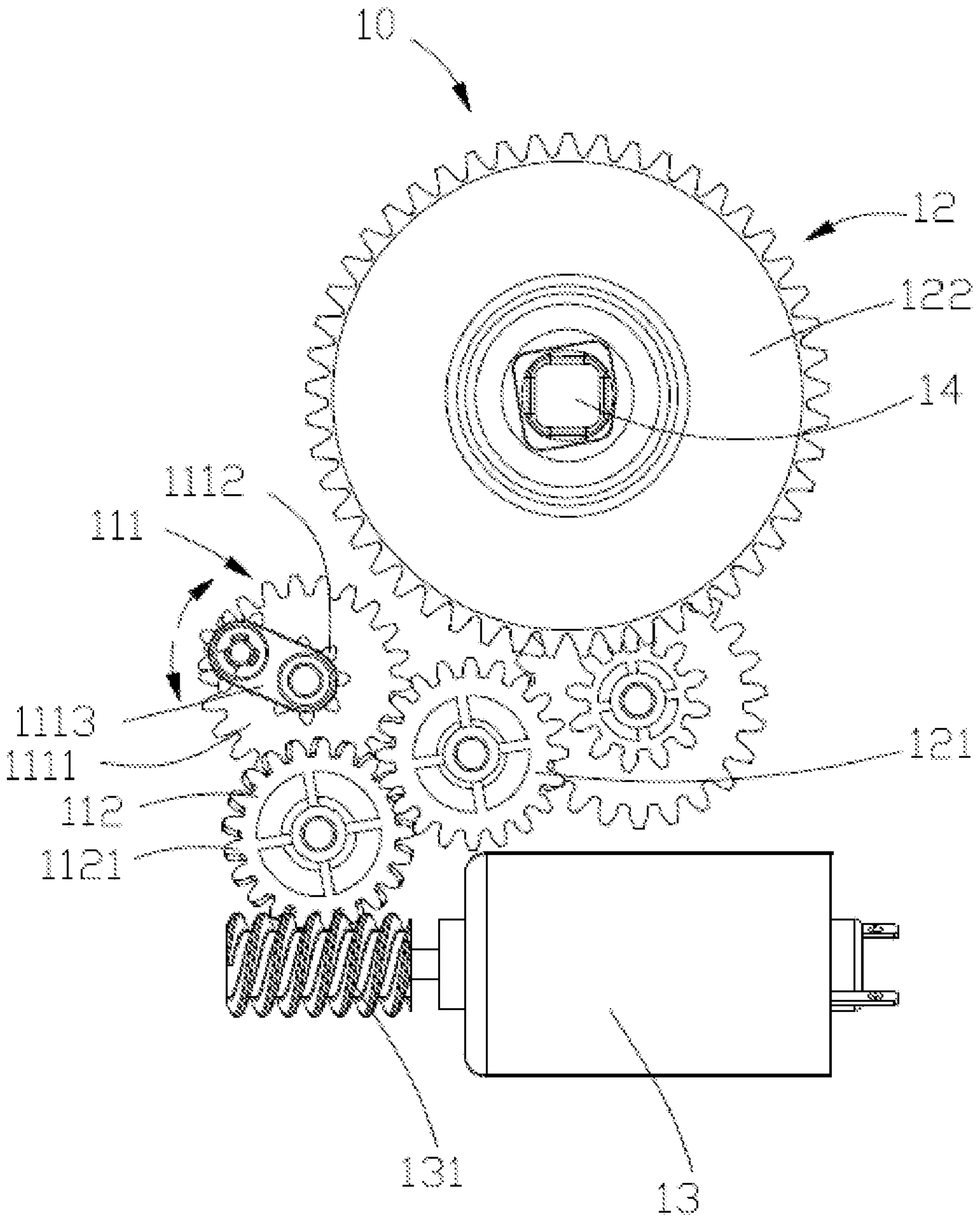
FIG. 6 is a schematic diagram of an internal structure of a power device in a state that a third gear is in a second position in one embodiment of this application.

When the third gear 1112 is in the second position, as shown in FIG. 6, the third gear 1112 is separated from the first gear 121, and the first transmission assembly 11 and the second transmission assembly 12 are in the state of no transmission connection.

Figure 7:
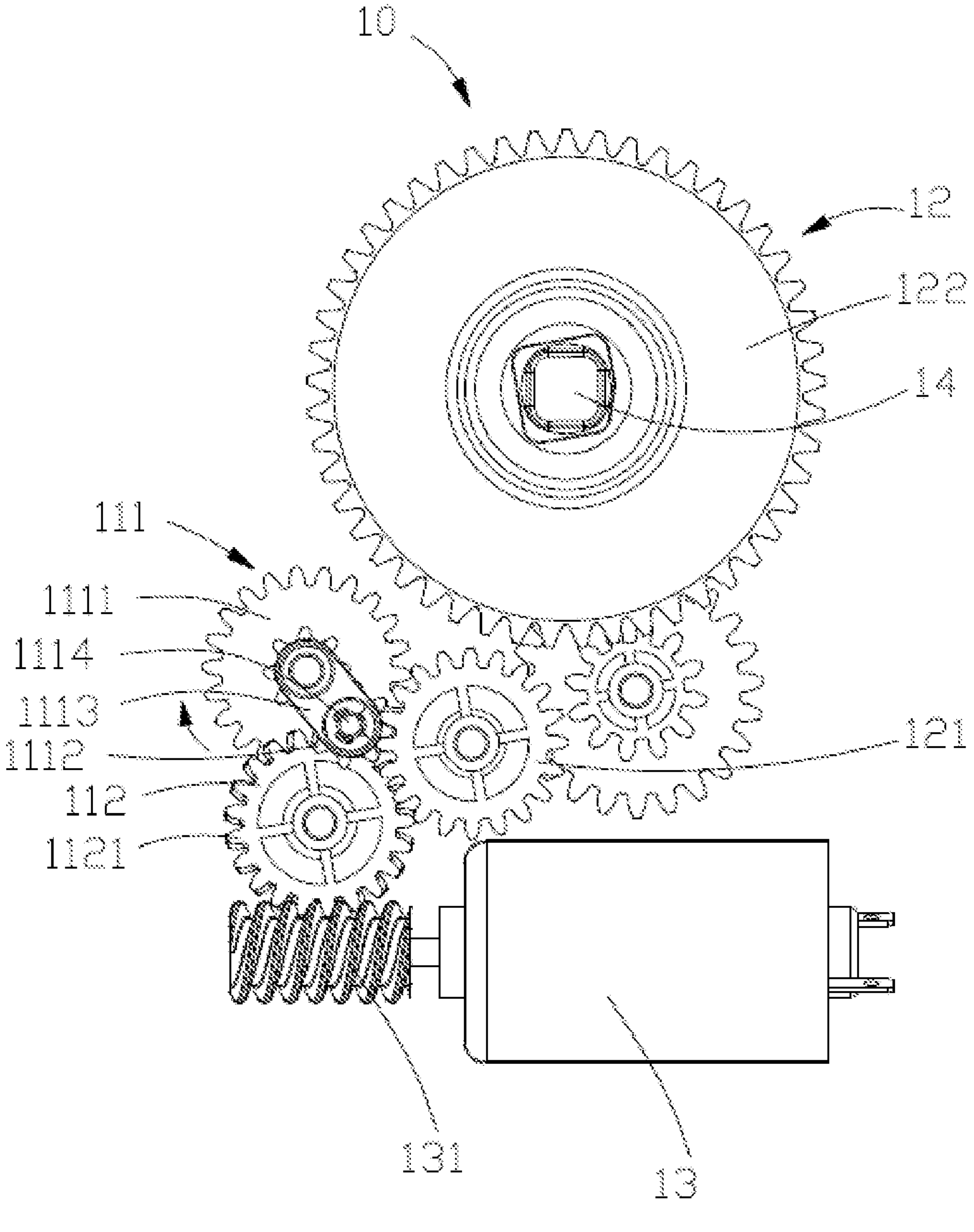
FIG. 7 is a schematic diagram of an internal structure of a power device in a state that a third gear is in a third position in one embodiment of this application.

When the third gear 1112 is in the third position, as shown in FIG. 7, the third gear 1112 is in meshed connection with the first gear 121, the third gear 1112 is configured to drive the first gear 121 to rotate along a second direction, the first gear 121 drives the spindle 14 to rotate, and the spindle 14 drives the dead bolt 20 to move and extend, where the second direction is opposite to the first direction.

According to the lock 100 in the above embodiment, the clutch assembly 111 of the first transmission assembly 11 has three states, which are corresponding states when the third gear 1112 is in the first position, the second position, and the third position, respectively; when the third gear 1112 is in the first or third position, the first transmission assembly 11 and the second transmission assembly 12 are in a state of transmission connection, and the dead bolt 20 is caused to retract or extend through transmission, to implement unlocking or locking; and when the third gear 1112 is in the second position, the first transmission assembly 11 and the second transmission assembly 12 are in the state of no transmission connection. In this way, through a clutch function of the clutch assembly 111, the third gear 1112 is caused to be in the second position. When a user uses a mechanical key or turns a knob in a door to open the lock, the turning action of the user does not need to overcome a resistance force generated by the motor 13 and gear meshing, which can protect the motor 13, prolong the service life of the motor 13, reduce the impact of the service life of the motor 13 on the lock 100, facilitate the user to open the lock smoothly, and improve the usage experience of the user.

In an embodiment, during the process that the second gear 1111 drives the third gear 1112 to rotate, the third gear 1112 is configured to remain stationary relative to the second gear 1111 or rotate about an axis of the second gear 1111. When the third gear 1112 rotates about the axis of the second gear 1111, an axis of the third gear 1112 rotates about the axis of the second gear 1111, and the third gear 1112 also rotates about the axis of the third gear 1112. When the second gear 1111 drives the third gear 1112 to rotate and the third gear 1112 remains stationary relative to the second gear 1111, the third gear 1112 rotates about the axis of the third gear 1112.

In an embodiment, when the lock 100 is normally in a closed and clutch protected state, the third gear 1112 is in the second position (as shown in FIG. 6), and the first transmission assembly 11 and the second transmission assembly 12 are in the state of no transmission connection.

In an embodiment, when the motor 13 executes an unlocking action, the second gear 1111 drives the third gear 1112 to rotate from the second position to the first position (a clockwise direction shown by an arrow in FIG. 6); and after the third gear 1112 moves to the first position, the third gear 1112 is in meshed connection with the first gear 121, the second gear 1111 continues driving the third gear 1112 to rotate, the third gear 1112 rotates in a manner of remaining stationary and drives the first gear 121 to rotate along the first direction, the first gear 121 drives the spindle 14 to rotate, and the spindle 14 drives the dead bolt 20 to move and retract, to complete unlocking.

In an embodiment, when the motor 13 executes a locking action, the second gear 1111 drives the third gear 1112 to rotate from the second position to the third position (an anticlockwise direction shown by an arrow in FIG. 6), or to rotate from the first position to the third position (an anticlockwise direction shown by an arrow in FIG. 5); and after the third gear 1112 moves to the third position, the third gear 1112 is in meshed connection with the first gear 121, the second gear 1111 continues driving the third gear 1112 to rotate, the third gear 1112 rotates in a manner of remaining stationary and drives the first gear 121 to rotate along the second direction, the first gear 121 drives the spindle 14 to rotate, and the spindle 14 drives the dead bolt 20 to move and extend, to complete locking.

In an embodiment, after the locking is completed, the motor 13 executes a clutch action, the second gear 1111 drives the third gear 1112 to rotate from the third position to the second position (a clockwise direction shown by an arrow in FIG. 7), and until the third gear 1112 moves to the second position, the motor 13 stops working.

Figure 8:
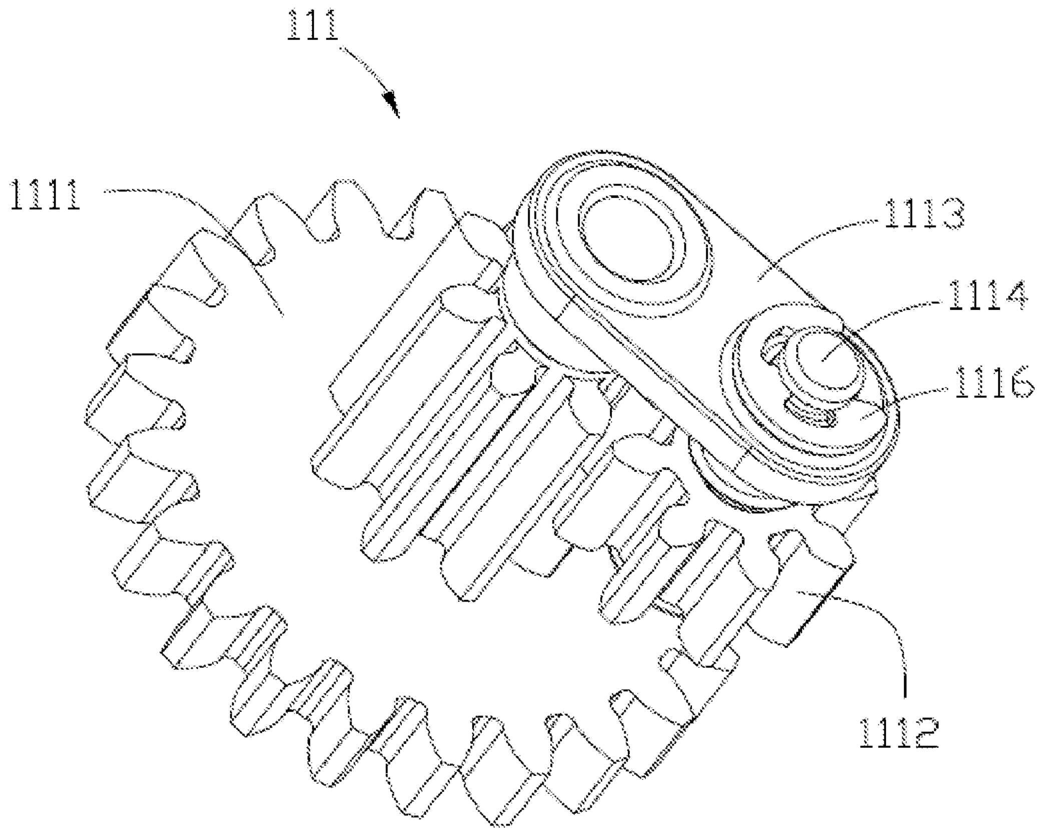
FIG. 8 is a schematic structural diagram of a clutch assembly in one embodiment of this application.
Figure 9:
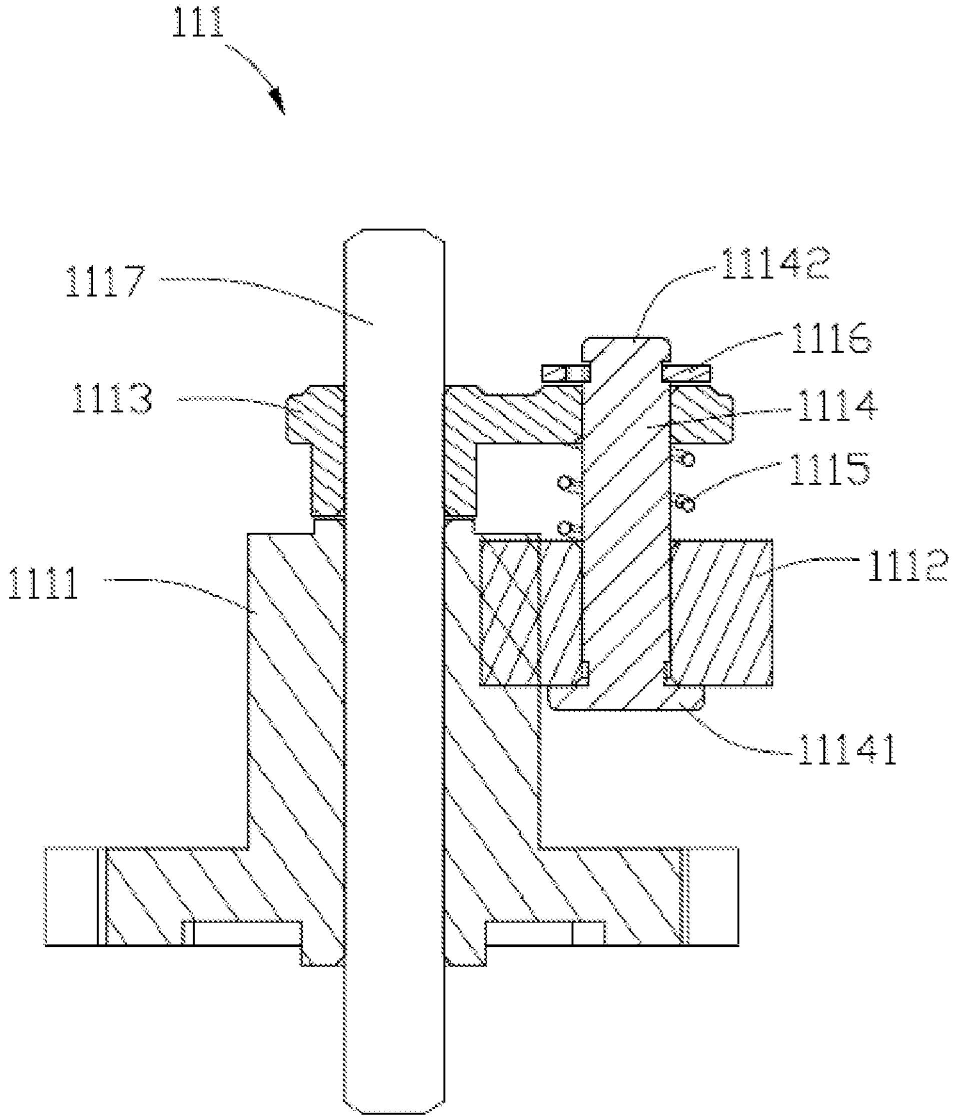
FIG. 9 is a sectional view of a clutch assembly in one embodiment of this application.

Referring to FIG. 8 and FIG. 9, in an embodiment, the clutch assembly 111 further includes a first shaft 1114 connected to the third gear 1112 and the connector 1113, and the third gear 1112 is configured to rotate about an axis of the first shaft 1114. The first shaft 1114 is connected to the third gear 1112 and the connector 1113, which helps to limit a distance between the third gear 1112 and the connector 1113, and reduce the risk of the third gear 1112 moving relative to the connector 1113.

In an embodiment, the first shaft 1114 includes a flange 11141 located on one side of the third gear 1112 that faces away from the connector 1113 and connected to the third gear 1112. The flange 11141 has a support limit effect on the third gear 1112, and limits its axial movement away from the connector 1113, thereby reducing the risk of the third gear 1112 moving relative to the connector 1113.

In an embodiment, the clutch assembly 111 further includes a first elastic element 1115 arranged between the connector 1113 and the third gear 1112 and connected to the connector 1113 and the third gear 1112. The elastic element continuously outputs an elastic acting force to the connector 1113 and the third gear 1112. The elastic element and the flange 11141 form a clamping mechanism for the third gear 1112, which not only helps to limit the movement of the third gear 1112, but also can limit the rotation of the third gear 1112 relative to the first shaft 1114, that is, limit the autorotation of the third gear 1112.

In an embodiment, the first shaft 1114 includes an excess part 11142 located on one side of the connector 1113 that faces away from the third gear 1112. The first transmission assembly 11 further includes a first limit element 1116 connected to the excess part 11142 and the connector 1113. The first limit element 1116 is connected to the excess part 11142 and the connector 1113, and in combination with the elastic force of the first elastic element 1115 on the connector 1113, the first limit element 1116 and the first elastic element 1115 form a clamping mechanism for the connector 1113, which helps to limit the movement of the first shaft 1114 relative to the connector 1113 and the rotation of the first shaft 1114 relative to the connector 1113.

In an embodiment, when the third gear 1112 is in the second position, if the second gear 1111 drives the third gear 1112 to rotate, the third gear 1112 rotates under the cooperation of the connector 1113, the first shaft 1114, the first elastic element 1115, and the first limit element 1116, and rotates about the axis of the second gear 1111, to implement switching between the first position and the second position.

In an embodiment, the third gear 1112 is always in meshed connection with the second gear 1111, such that when the third gear 1112 is in the second position and the second gear 1111 remains stationary, the second gear 1111 plays a limiting role on the third gear 1112, thereby reducing the rotation and movement of the third gear 1112, and improving the seismic performance of the lock 100.

In an embodiment, when the third gear 1112 is in the first or third position, the second gear 1111 drives the third gear 1112 to rotate, the third gear 1112 rotates relative to the first shaft 1114, and both the first shaft 1114 and the connector 1113 remain stationary.

In an embodiment, the third gear 1112 is configured to drive the first shaft 1114 to rotate synchronously. When the third gear 1112 is in the first or third position, the second gear 1111 drives the third gear 1112 to rotate, the third gear 1112 drives the first shaft 1114 to rotate synchronously, the first shaft 1114 rotates relative to the connector 1113, and the connector 1113 remains stationary.

In an embodiment, the first shaft 1114 is fixedly connected to the connector 1113. When the third gear 1112 is in the first or third position, the second gear 1111 drives the third gear 1112 to rotate, the third gear 1112 rotates relative to the first shaft 1114, and the first shaft 1114 and the connector 1113 remain stationary.

Figure 2:
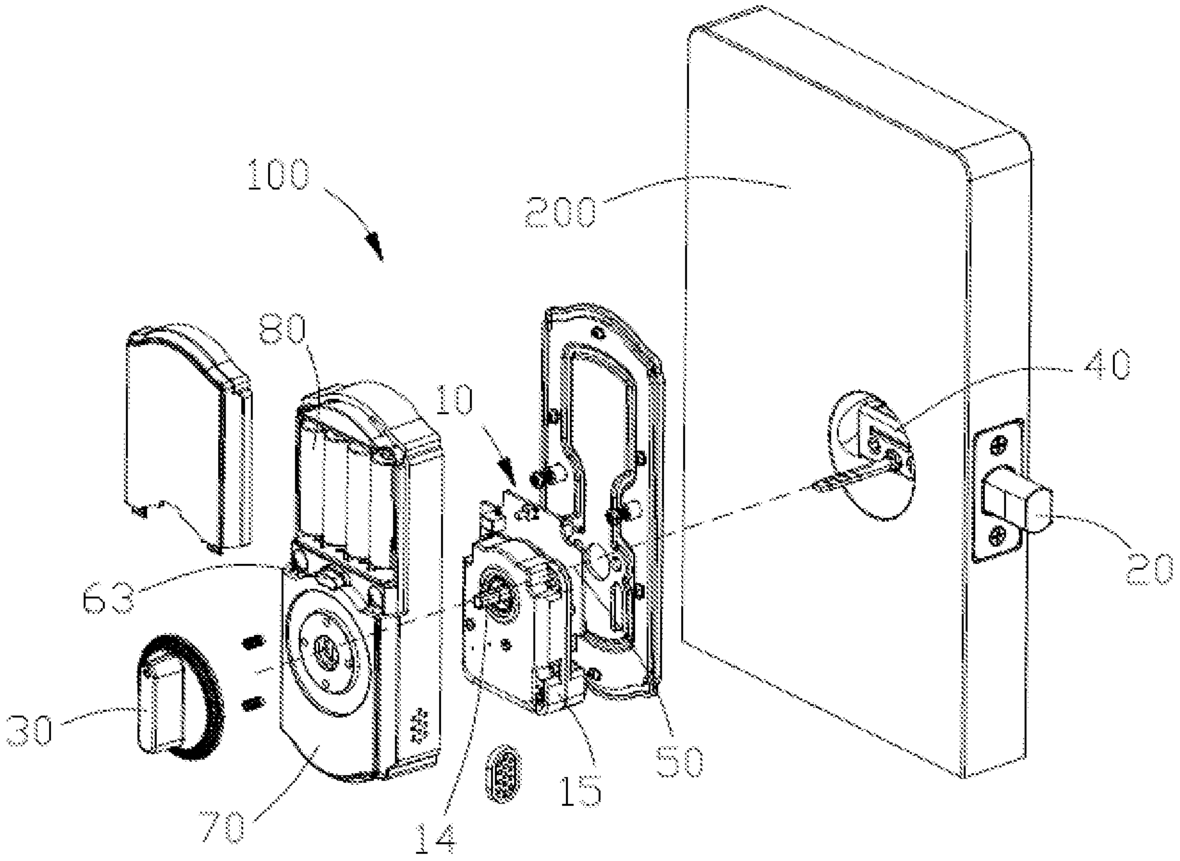
FIG. 2 is an exploded view of a structure shown in FIG. 1.
Figure 3:
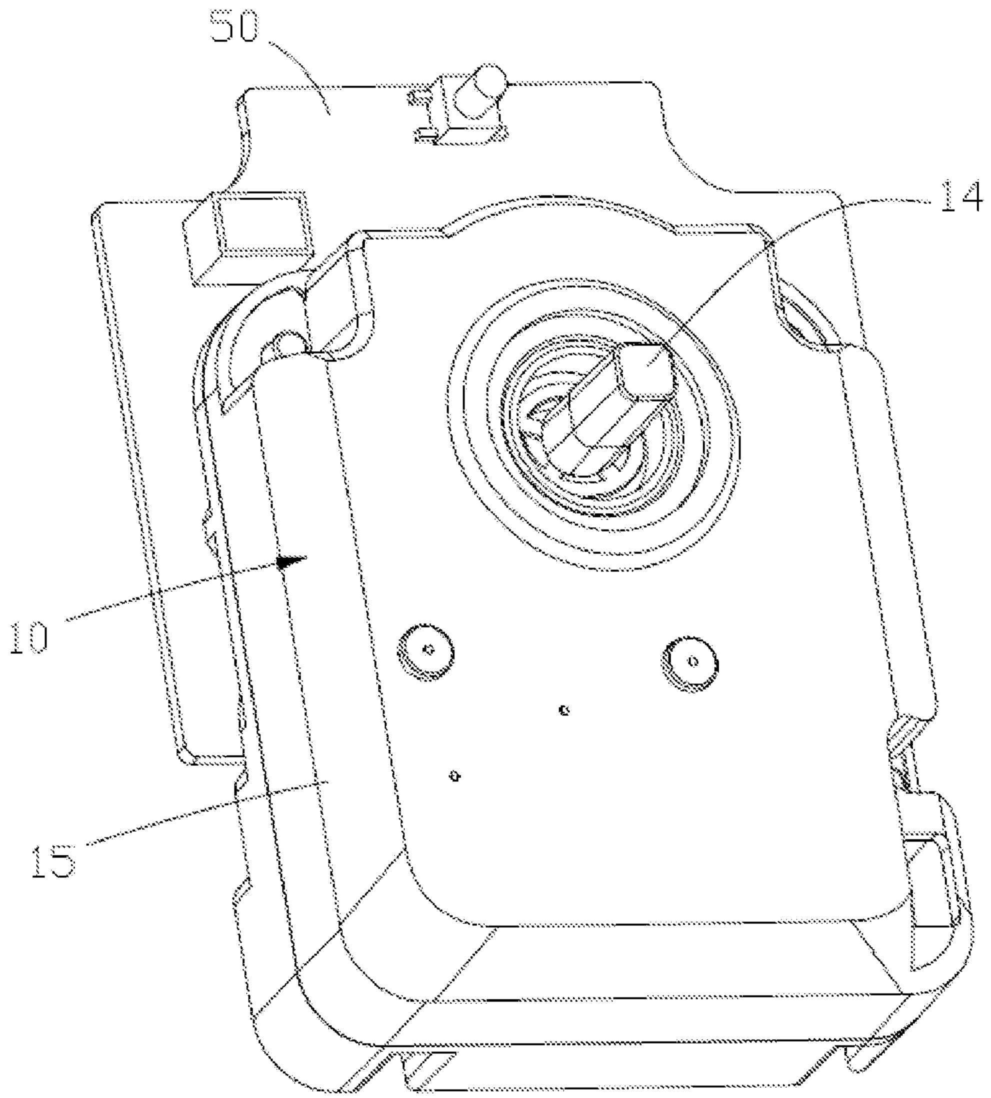
FIG. 3 is a schematic diagram of a structure that a circuit board is connected to a power device in one embodiment of this application.
Figure 4:
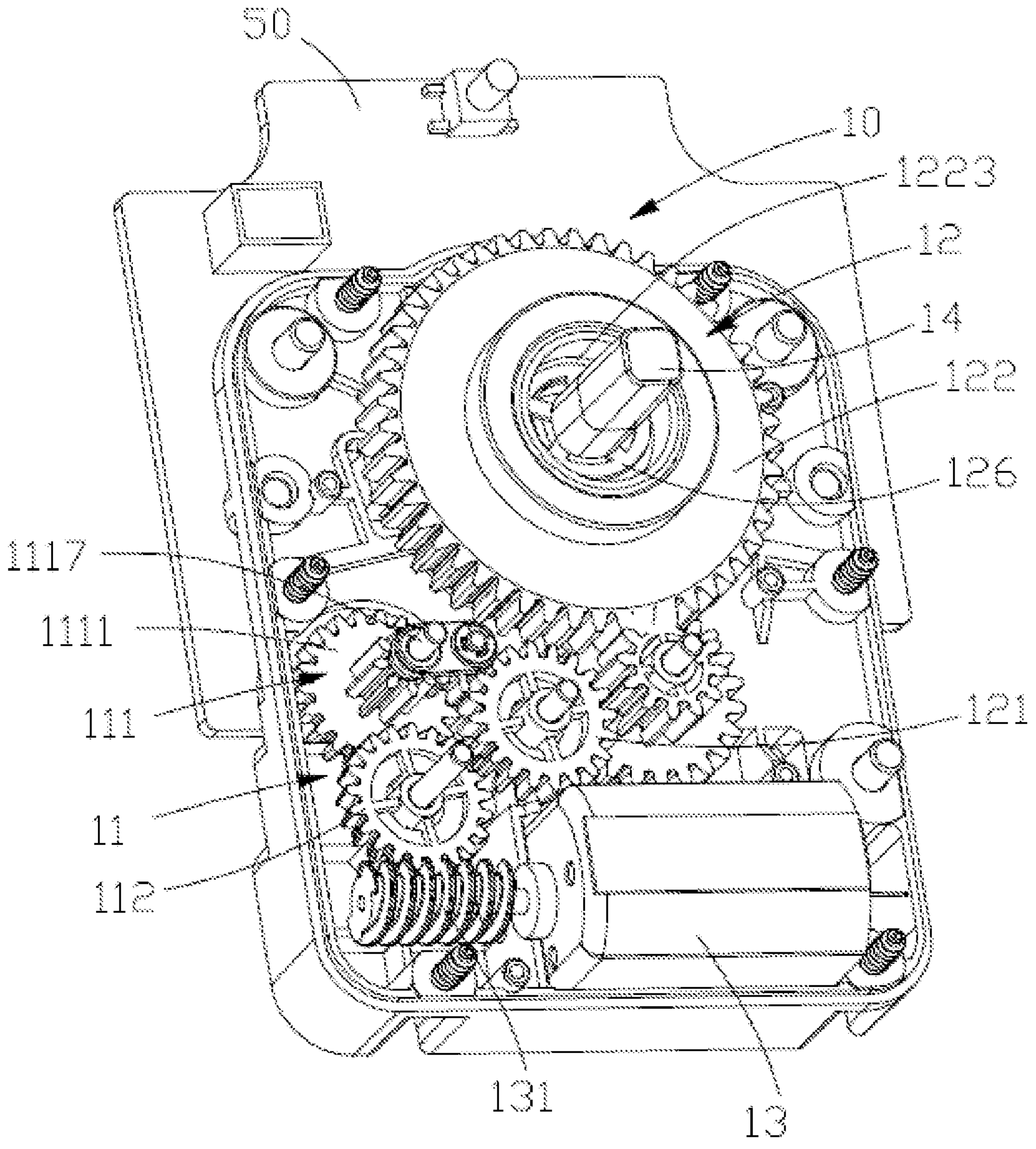
FIG. 4 is a schematic diagram of part of the structure shown in FIG. 3.

As shown in FIG. 2 to FIG. 4, in an embodiment, the power device 10 further includes a first housing 15, the first transmission assembly 11, the second transmission assembly 12, and the motor 13 are arranged in the first housing 15, and the spindle 14 has one part located in the first housing 15 and another part extending from the first housing 15. The first housing 15 has a limit protection effect on the first transmission assembly 11, the second transmission assembly 12, and the motor 13, and helps to reduce the risk of movement of the first transmission assembly 11, the second transmission assembly 12, and the motor 13 as well as the risk of damage to the first transmission assembly 11, the second transmission assembly 12, and the motor 13.

In an embodiment, the clutch assembly 111 further includes a second shaft 1117 connected to the first housing 15, the second gear 1111, and the connector 1113, and the second gear 1111 is configured to rotate about an axis of the second shaft 1117. The second shaft 1117 has a limit effect on the second gear 1111, thereby reducing the risk of the second gear 1111 moving relative to the first housing 15.

Figure 10:
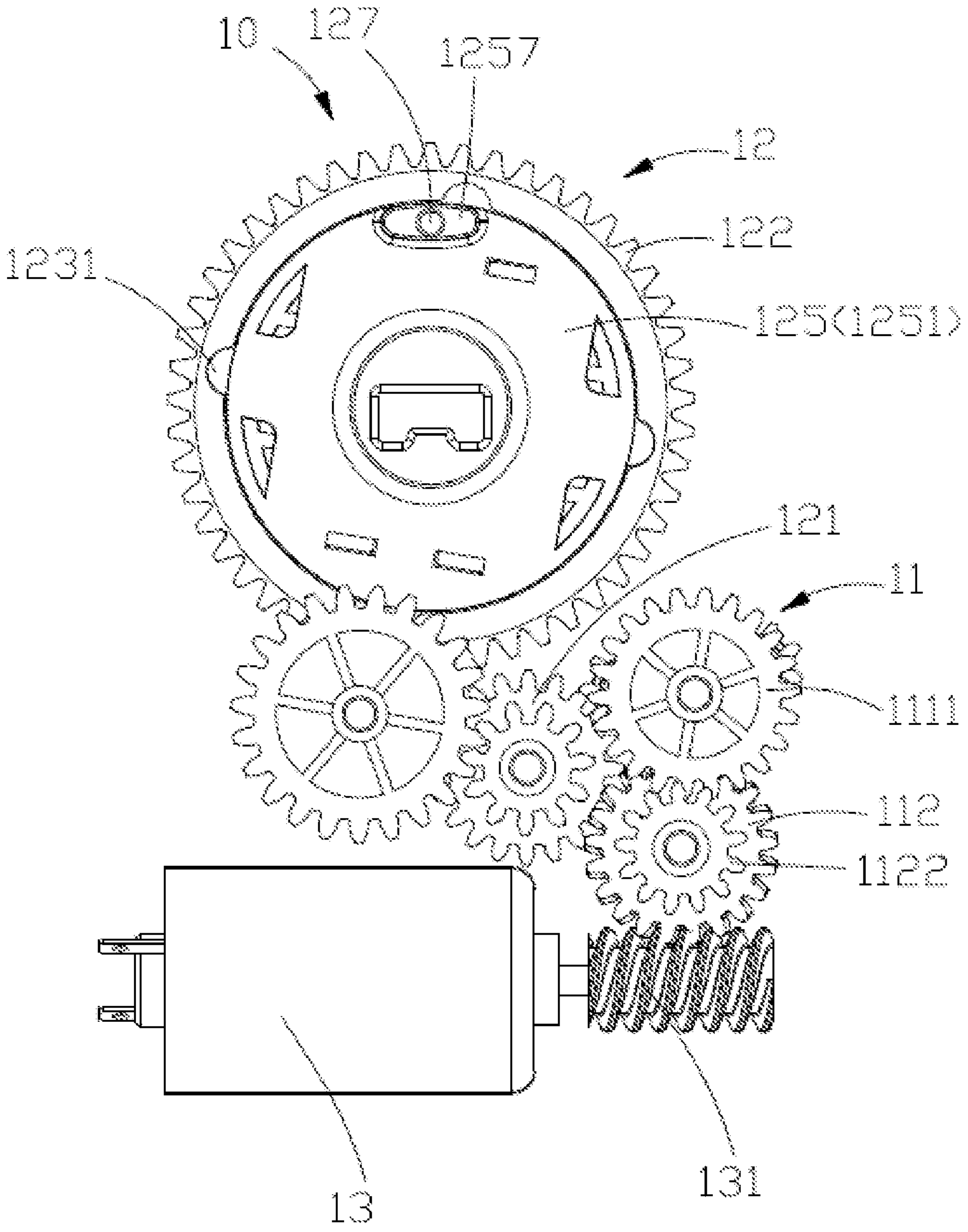
FIG. 10 is a schematic diagram of an internal structure of a power device when guards are in a first state in one embodiment of this application.
Figure 11:
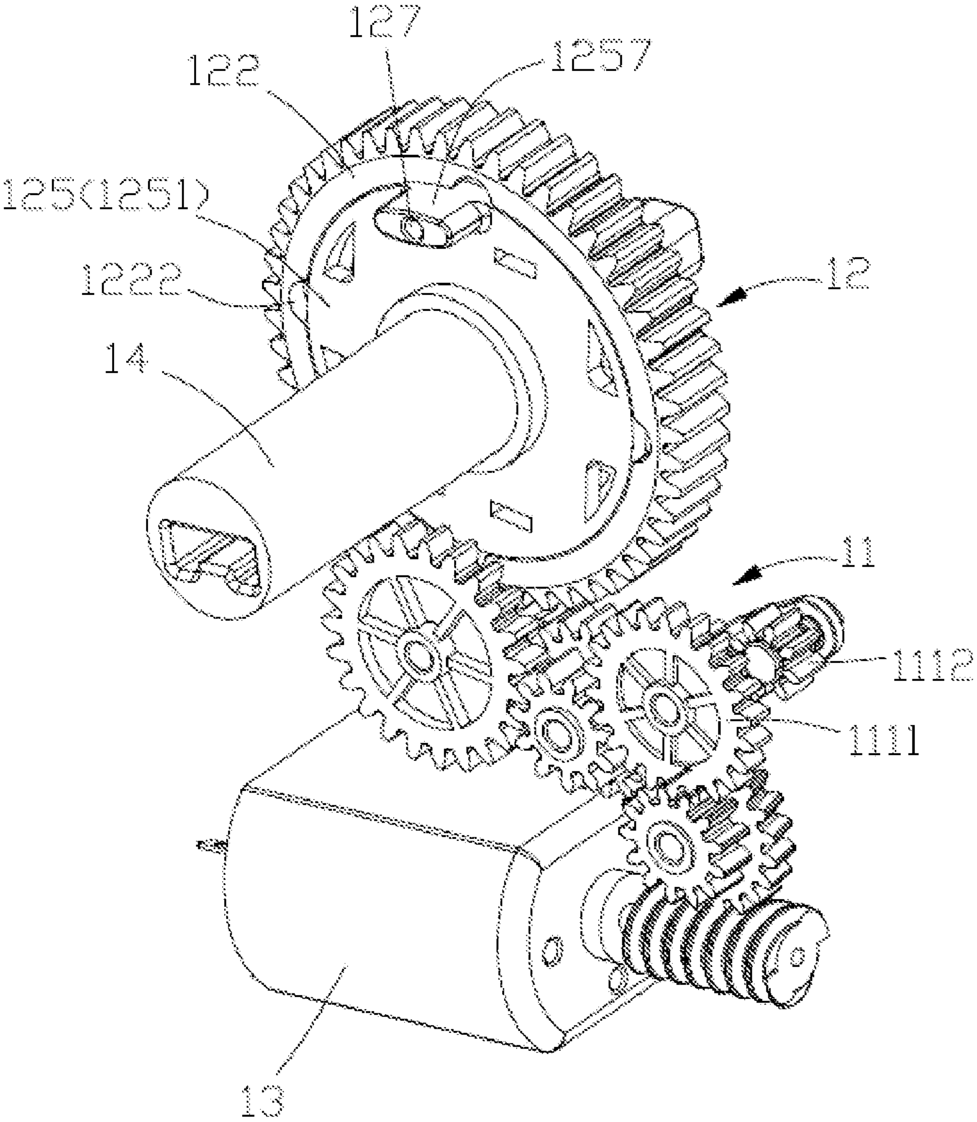
FIG. 11 is a schematic diagram of an internal structure of a power device when guards are in a second state in one embodiment of this application.

Referring to FIG. 10, in an embodiment, the first transmission assembly 11 further includes a fifth gear 112 connected to the second gear 1111 and the motor 13, the motor 13 is configured to drive the fifth gear 112 to rotate, and the fifth gear 112 is configured to drive the second gear 1111 to rotate.

In an embodiment, the fifth gear 112 includes a first tooth part 1121 and a second tooth part 1122, the first tooth part 1121 is connected to the motor 13, and the second tooth part 1122 is in meshed connection with the second gear 1111.

In an embodiment, the motor 13 includes a worm 131, the first tooth part 1121 has helical teeth, and the worm 131 is in meshed connection with the first tooth part 1121. The motor 13 is connected to the first transmission assembly 11 through the worm 131, which helps to increase an output torque of the power device 10 and improve the utilization of space in the power device 10.

In an embodiment, the worm 131 is a double-thread worm with the advantage of low rotational speed and high torque, which helps to increase the output torque of the motor 13 and improve the stability of the power device 10 during unlocking or locking. The first tooth part 1121 with the helical teeth is in tight meshed transmission with the double-thread worm, which helps to reduce the risk of jamming therebetween and the risk of influence on operation of the power device 10 due to jamming between the motor 13 and the first tooth part 1121.

As shown in FIG. 4, and FIG. 10 to FIG. 16, in an embodiment, the second transmission assembly 12 further includes a fourth gear 122, guards 123, and second elastic elements 124.

In an embodiment, the fourth gear 122 is arranged rotatably and connected to the first gear 121. In an embodiment, the fourth shaft 122 is in meshed connection with the first gear 121.

In an embodiment, the fourth gear 122 is provided with a first groove 1221 and second grooves 1222, the first groove 1221 is concavely arranged along an axial direction of the fourth gear 122, and the second grooves 1222 communicate with the first groove 1221 and are concavely arranged along a diameter direction of the fourth gear 122 and a direction away from an axis of the fourth gear 122. The axial direction of the fourth gear 122 coincides with an axial direction of the spindle 14. The first groove 1221 has a bottom wall in the axial direction of the fourth gear 122 and a side wall extending along a circumferential direction of the fourth gear 122. The second grooves 1222 are recessed outwards along a radial direction of the fourth gear 122 from the side wall of the first groove 1221.

In an embodiment, the guards 123 are arranged in the first groove 1221 and connected to the spindle 14 and the fourth gear 122, and each of the guards 123 includes a bulge 1231 arranged in a manner of extending along the diameter direction of the fourth gear 122 and the direction away from the axis of the fourth gear 122.

The second elastic elements 124 are connected to the guards 123 and configured to drive the guards 123 to move outwards along a radial direction.

The guards 123 have a first state and a second state in respect to the fourth gear 122.

Figure 14:
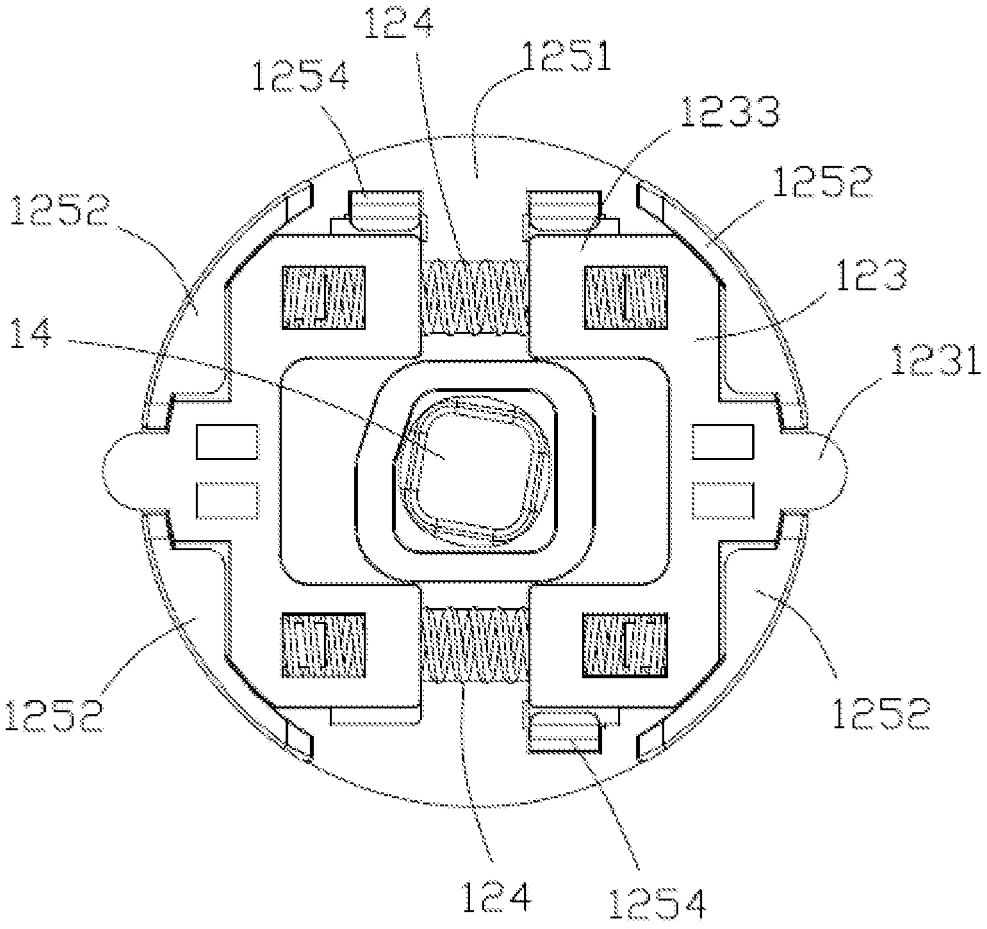
FIG. 14 is a schematic diagram of a partial structure of a power device when guards are in a first state in one embodiment of this application.

When the guards 123 are in the first state, as shown in FIG. 10 and FIG. 14, the bulges 1231 are located in the second grooves 1222, the second grooves 1222 limit rotation of the guards 123 through the bulges 1231, and the fourth gear 122, the guards 123, and the spindle 14 are configured to rotate about the axis of the fourth gear 122. In this case, the second transmission assembly 12 is in the state of transmission connection, and the spindle 14 and the second transmission assembly 12 are in the state of transmission connection.

Figure 15:
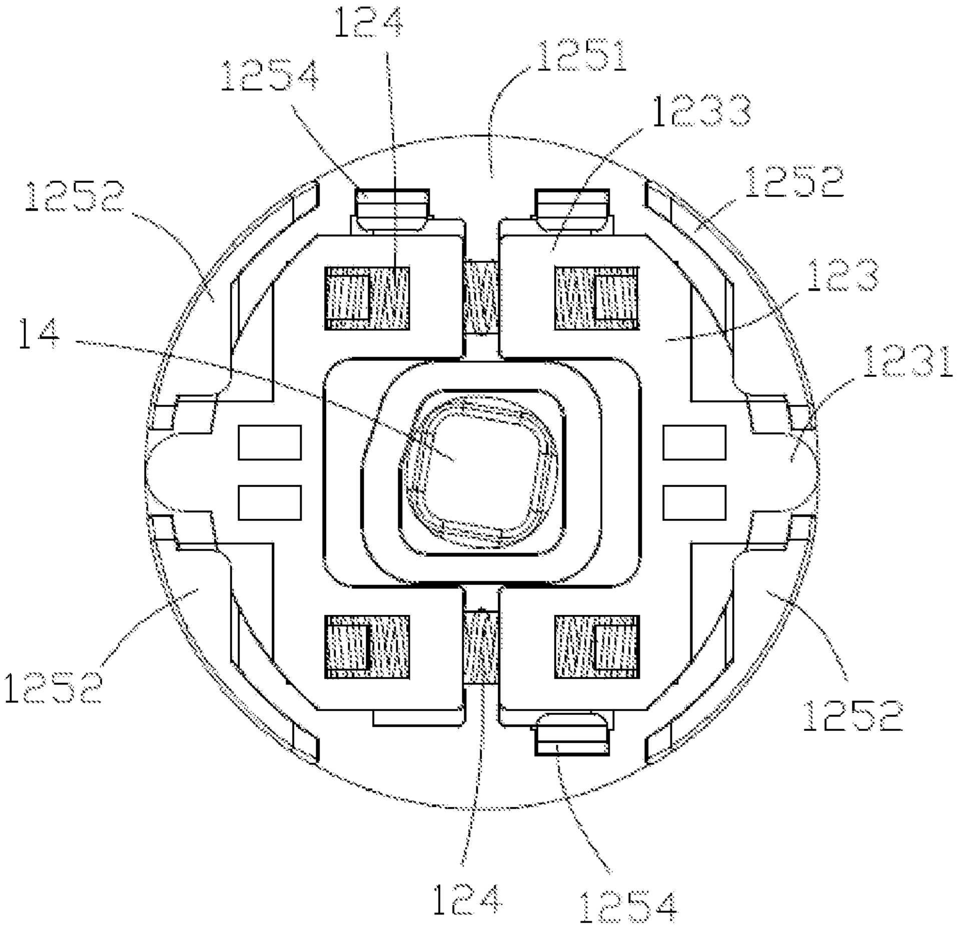
FIG. 15 is a schematic diagram of a partial structure of a power device when guards are in a second state in one embodiment of this application.
Figure 16:
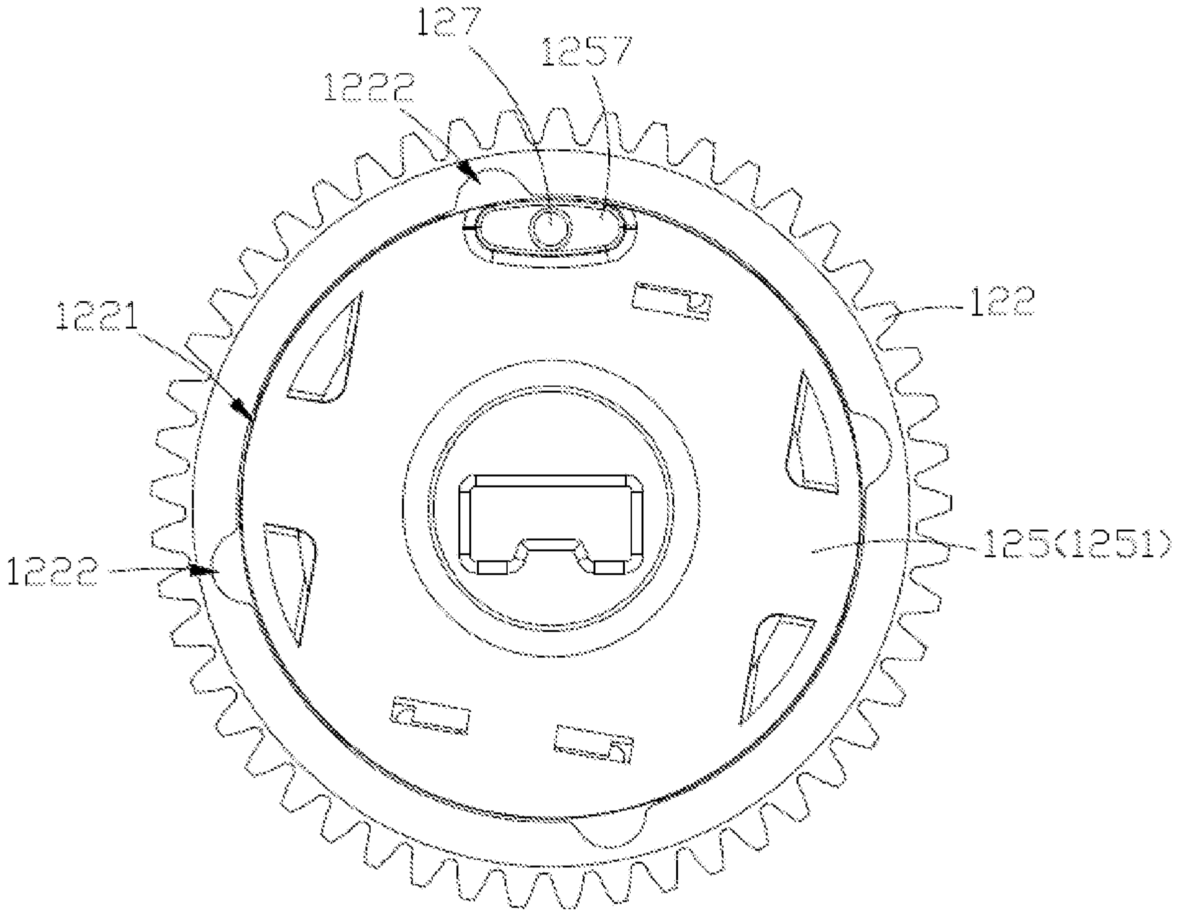
FIG. 16 is a schematic diagram of a partial structure of a power device when guards are in a second state in one embodiment of this application.
Figure 17:
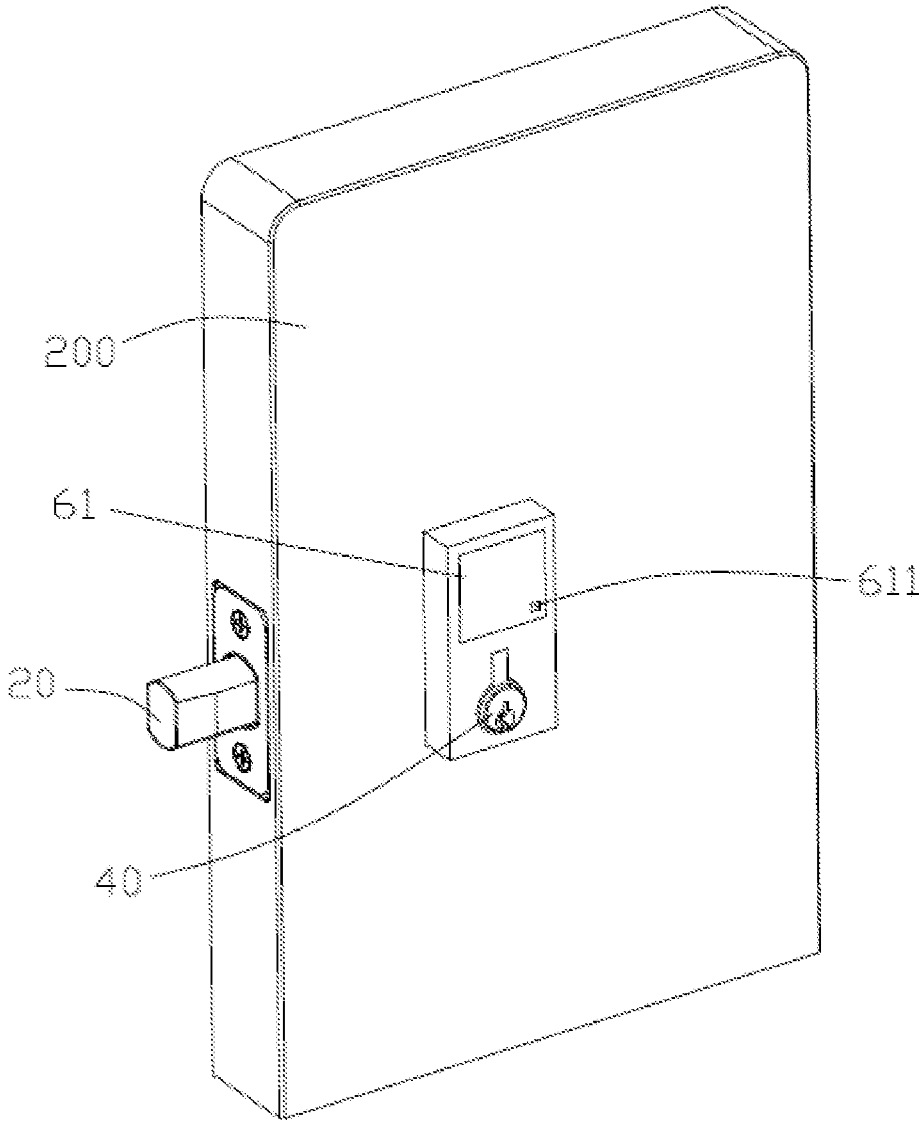
FIG. 17 is a schematic diagram of a lock mounted on a door, outside the door, in one embodiment of this application.
Figure 18:
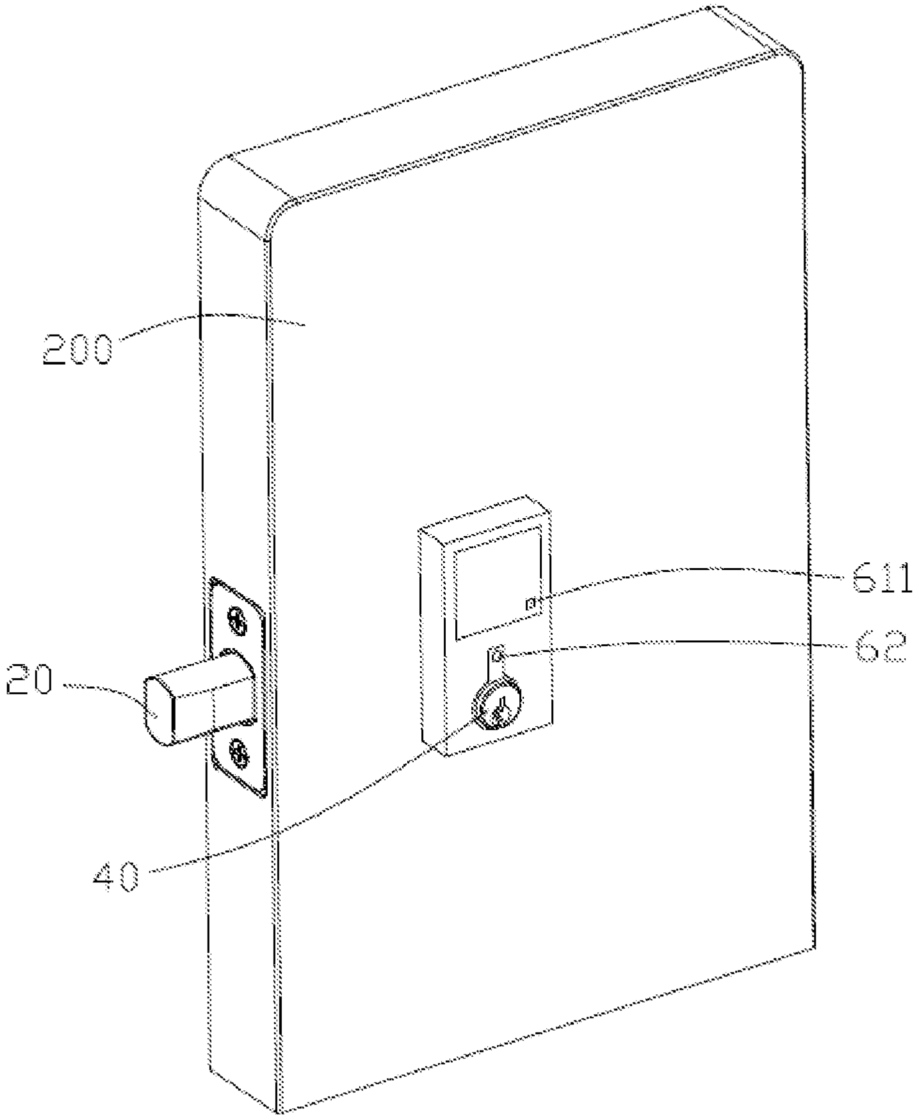
FIG. 18 is a schematic diagram of a lock mounted on a door, outside the door, in one embodiment of this application.
Figure 19:
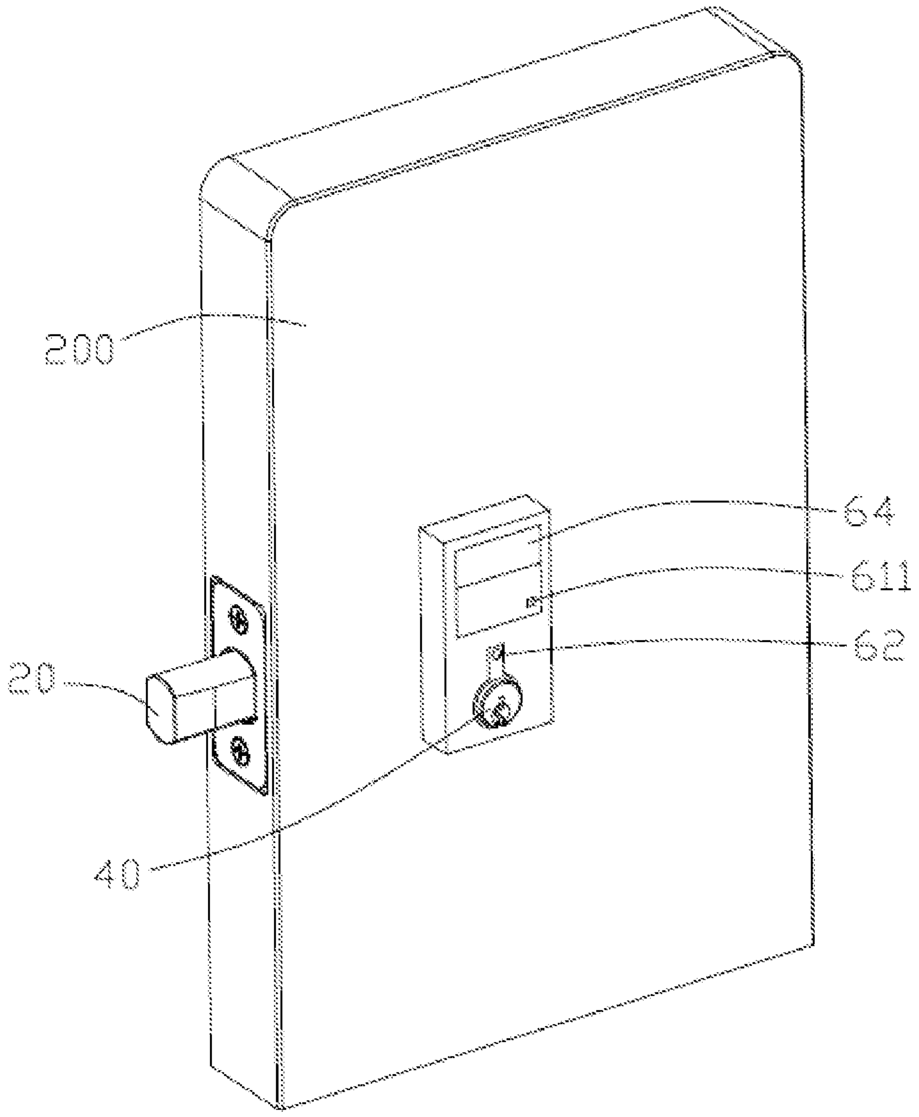
FIG. 19 is a schematic diagram of a lock mounted on a door, outside the door, in one embodiment of this application.
Figure 20:
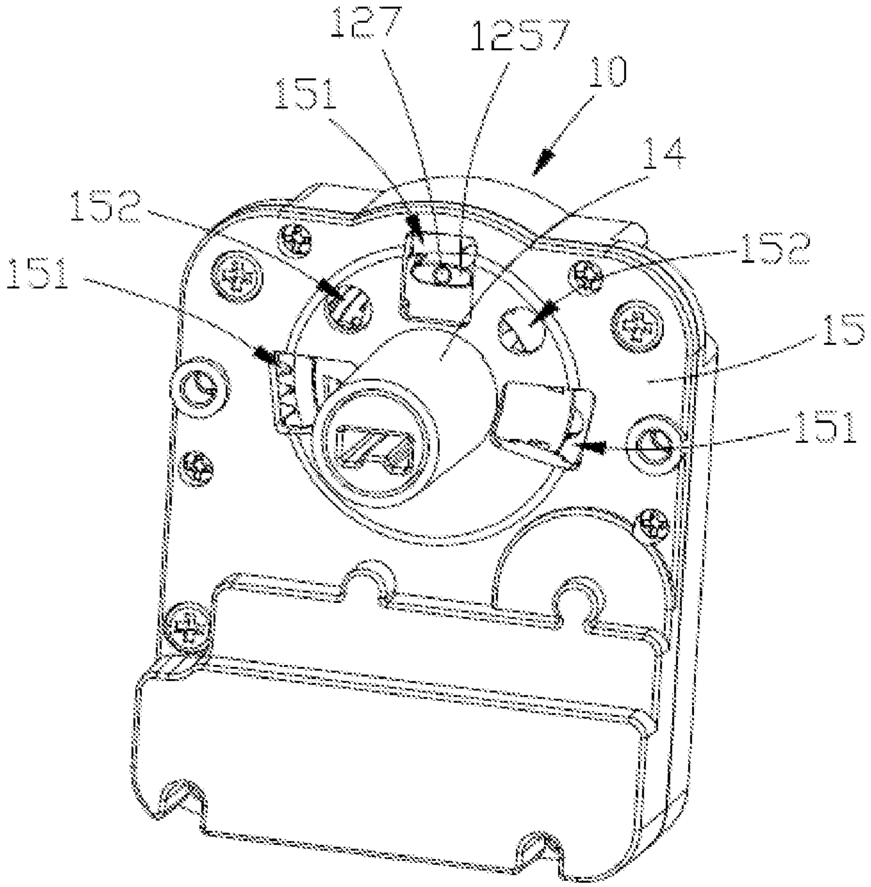
FIG. 20 is a schematic structural diagram of a power device in one embodiment of this application.
Figure 21:
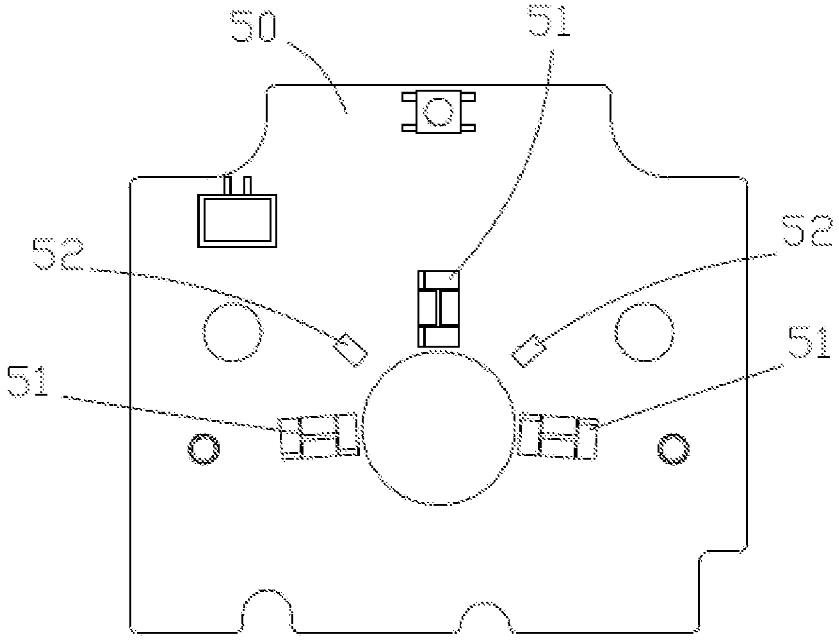
FIG. 21 is a schematic structural diagram of a circuit board in one embodiment of this application.

When the guards 123 are in the second state, as shown in FIG. 15 and FIG. 16, the bulges 1231 are separated from the second grooves 1222 and connected to a side wall of the first groove 1221, the second elastic elements 124 are in a compressed deformation state, and the guards 123 and the spindle 14 are configured to rotate relative to the fourth gear 122. In this case, the second transmission assembly 12 are in the state of no transmission connection, which helps to reduce the impact of rotation of the spindle 14 on the motor 13 and prolong the service life of the motor 13.

In an embodiment, when the motor 13, the first transmission assembly 11, the second transmission assembly 12, and the spindle 14 are in an operating state of an unlocking process or a locking process, if the dead bolt 20 cannot normally extend or retract due to unexpected factors and becomes stuck, the motor 13 continuously outputs the torque, which affects the service life of the motor 13. In this case, due to the sticking of the dead bolt 20, the spindle 14 is unable to rotate, a radial acting force occurs between the guards 123 and the fourth gear 122 to cause the bulges 1231 to slide into the first groove 1221 from the second grooves 1222, and the guards 123 switch from the second state to the first state, such that the second transmission assembly 12 is in the state of no transmission, thereby reducing the impact on the motor 13, and prolonging the service life of the motor 13.

In an embodiment, under the action of the second elastic elements 124, end parts of the bulges 1231 are in pressed connection with the first groove 1221 or the second grooves 1222. When the bulges 1231 are located in the second grooves 1222, the use of an elastic acting force of the second elastic elements 124 helps to reduce the risk of the bulges 1231 sliding out of the second grooves 1222 and improve the seismic performance of the lock 100.

In an embodiment, the second grooves 1222 and the first groove 1221 are in circular arc transition, which facilitates the bulges 1231 to slide from the second grooves 1222 into the first groove 1221.

In an embodiment, the fourth gear 122 is provided with the plurality of second grooves 1222 arranged along a circumferential direction of the fourth gear 122. During the rotation of the guards 123 relative to the fourth gear 122, the bulges 1231 slide into the second grooves 1222 from the first groove 1221 and slide into the first groove 1221 from the second grooves 1222. The plurality of the second grooves 1222 are provided, such that when the dead bolt 20 returns to normal from the stuck state, it is advantageous to reduce a time interval in which the bulges 1231 slide into the second grooves 1222 from the first groove 1221, and shorten the time for the power device 10 to restore normal transmission.

In an embodiment, the second transmission assembly 12 includes the two guards 123 and the two second elastic elements 124, the two guards 123 are symmetrically arranged with the axis of the fourth gear 122 as a center, each of the two second elastic elements 124 is connected to the two guards 123, and the two second elastic elements 124 are symmetrically arranged with the axis of the fourth gear 122 as the center. The two symmetrical guards 123 and the two second elastic elements 124 are arranged, which helps to improve the stability of connection between the guards 123 and the fourth gear 122.

In an embodiment, each of the guards 123 is provided with a limit slot 1232, and at least part of each of the second elastic elements 124 is arranged in the limit slot 1232. The limit slots 1232 have a limit effect on the second elastic elements 124, and help to reduce the risk of the second elastic elements 124 moving relative to the guards 123.

In an embodiment, each of the guards 123 further includes a base 1233, the bulge 1231 is arranged on the base 1233, and the bases 1233 are connected to the second elastic elements 124.

In an embodiment, the second transmission assembly 12 further includes a second limit element 125, and the second limit element 125 includes a first part 1251 and second parts 1252 connected to each other.

In an embodiment, the bases 1233 are located between the first part 1251 and a bottom wall of the first groove 1221 along the axial direction of the fourth gear 122. The first part 1251 has a limit effect on the guards 123 along the axial direction of the fourth gear 122, which helps to reduce the risk of the guards 123 moving out of the first groove 1221.

In an embodiment, the second parts 1252 are located between the bases 1233 and the side wall of the first groove 1221 along the diameter direction of the fourth gear 122. The second parts 1252 have a limit effect on the guards 123 along the diameter direction of the fourth gear 122, which helps to reduce the risk of the guards 123 moving in the first groove 1221.

In an embodiment, the second limit element 125 includes the plurality of second parts 1252 arranged along the circumferential direction of the fourth gear 122, and a gap 1253 is provided between adjacent two of the plurality of second parts 1252; and at least part of the bulge 1231 is located in the gap 1253, which helps to further improve the limit effect on the guards 123 and guide the movement of the guards 123 along the radial direction, facilitates switching of the guards 123 between the first state and the second state, and improves the protective effect of the lock 100 on the motor 13.

In an embodiment, the second limit element 125 further includes guide parts 1254 arranged at the first part 1251 and connected to the guards 123. The guide parts 1254 have a guiding effect on the movement of the guards 123 along the radial direction, help to improve the stability of movement of the guards 123 relative to the second limit element 125, facilitate the switching of the guards 123 between the first state and the second state, and improve the protective effect of the lock 100 on the motor 13.

In an embodiment, the second limit element 125 is provided with a first through hole 1255 of which a center coincides with the axis of the fourth gear 122.

The spindle 14 includes a first limit part 141 located in the first through hole 1255 and connected to a side wall of the first through hole 1255, and the first limit part 141 and the first through hole 1255 are configured to cause the spindle 14 and the second limit element 125 to rotate synchronously. Through the cooperative connection between the first limit part 141 and the first through hole 1255, the spindle 14 can drive the second limit element 125 and the guards 123 to rotate synchronously, or the second limit element 125 drives the spindle 14 to rotate synchronously.

In an embodiment, along a cross section perpendicular to the axis of the fourth gear 122, a cross section of the first through hole 1255 is square, and a cross section of the first limit part 141 is square, which helps to improve the stability of transmission connection between the spindle 14 and the second limit element 125.

Figure 12:
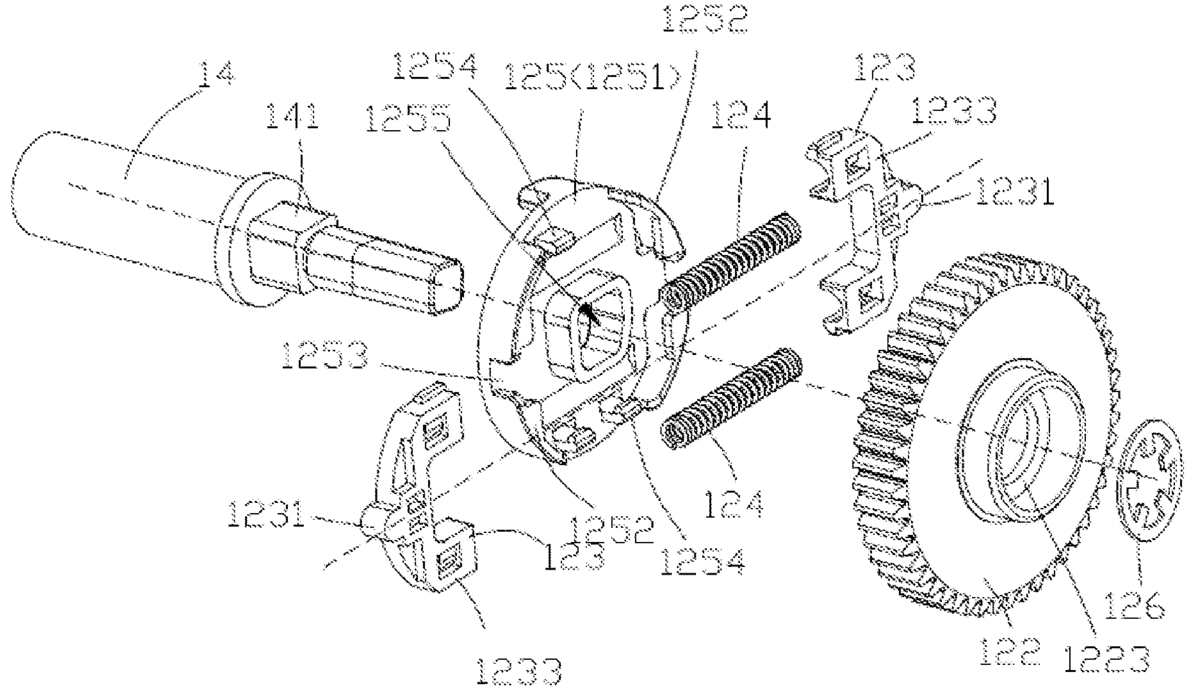
FIG. 12 is an exploded view of a partial structure of a power device in one embodiment of this application.
Figure 13:
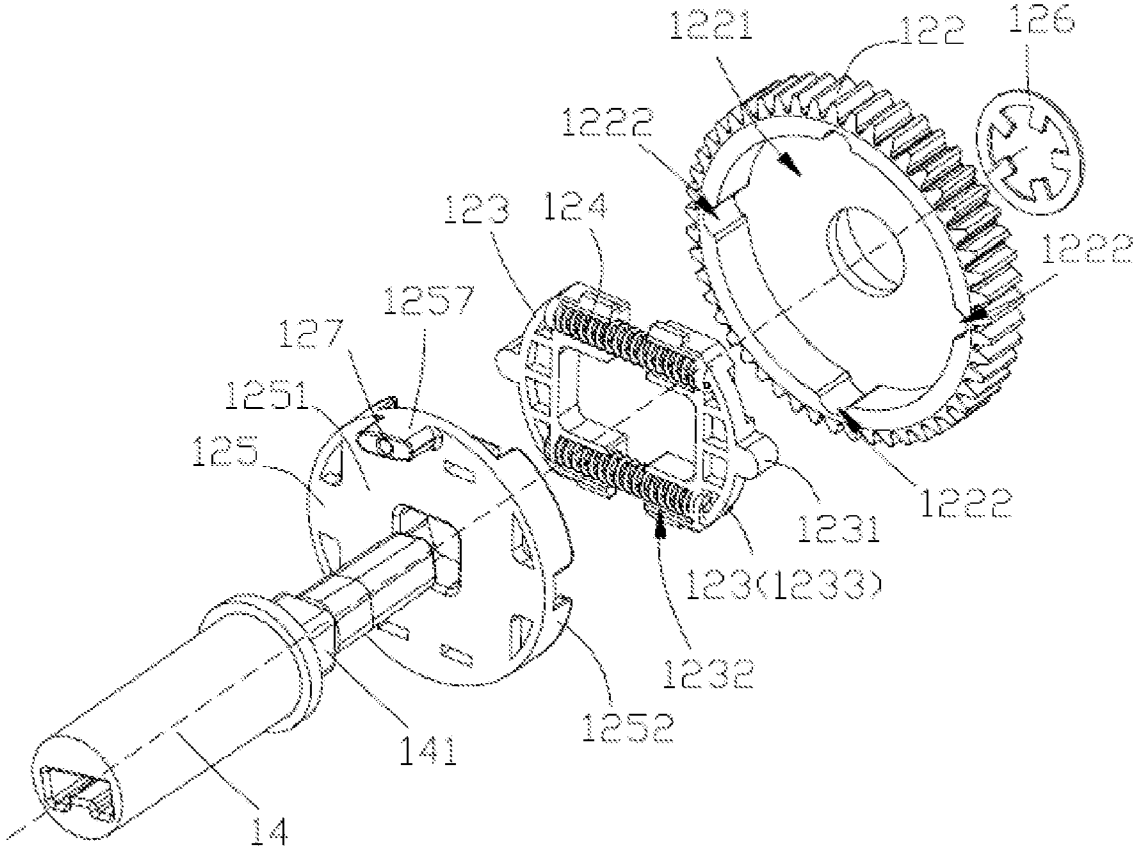
FIG. 13 is an exploded view of a partial structure of a power device in one embodiment of this application.

As shown in FIG. 4, FIG. 12, and FIG. 13, in an embodiment, the second transmission assembly 12 further includes a third limit element 126 connected to the spindle 14 and the fourth gear 122 and configured to limit the movement of the spindle 14 and the fourth gear 122 along their axial directions.

In an embodiment, the fourth gear 122 includes a second limit part 1223, part of the spindle 14 penetrates through the second limit part 1223, and the third limit element 126 is located on one side of the fourth gear 122 that faces away from the second limit element 125, and is connected to the second limit part 1223 and the part of the second limit part 1223 that is penetrated by the spindle 14.

In an embodiment, the third limit element 126 is a snap spring.

As shown in FIG. 1, FIG. 2, and FIG. 17 to FIG. 19, in an embodiment, the lock 100 further includes a knob 30 connected to the spindle 14 and configured to drive the spindle 14 to rotate. When the third gear 1112 is in the second position, the knob 30 is turned to drive the spindle 14 to rotate, and the spindle 14 drives the dead bolt 20 to extend or retract, to implement locking or unlocking.

In an embodiment, the lock 100 further includes a lock cylinder assembly 40 connected to the spindle 14 and configured to be inserted with a key and drive the spindle 14 to rotate. When the third gear 1112 is in the second position, the key is inserted into the lock cylinder assembly 40 and turned, the lock cylinder assembly 40 drives the spindle 14 too rotate, and the spindle 14 drives the dead bolt 20 to extend or retract, to implement locking or unlocking. In an embodiment, a mechanism for the lock cylinder assembly 40 to drive the dead bolt 20 to move is conventionally arranged in the art, and its detailed structure is not specifically limited in this application.

In an embodiment, the lock cylinder assembly 40 and the knob 30 are located at two ends of the lock 100 respectively along the axial direction of the spindle 14. In an embodiment, the knob 30 is located in a door 200, and a keyhole of the lock cylinder assembly 40 is located outside the door 200, which helps to improve the security performance of the lock 100.

In an embodiment, when the user successfully opens the door 200 to enter a room and closes the door 200, the user turns the knob 30, and the spindle 14 drives the dead bolt 20 to extend.

In an embodiment, when the lock 100 is in a closed state and the third gear 1112 is in the second position, the user turns the knob 30 indoors, and the spindle 14 drives the dead bolt 20 to retract.

In an embodiment, the lock 100 further includes a circuit board 50 connected to the motor 13 and configured to control the motor 13 to execute the unlocking or locking action. A control program is written into the circuit board 50 to implement automatic control on the motor 13, which helps to improve the intelligent level of the lock 100.

In an embodiment, the lock 100 further includes a password assembly 61 connected to the circuit board 50. An instruction is input by the password assembly 61 to trigger a corresponding control program on the circuit board 50 to execute the unlocking or locking action.

In an embodiment, the password assembly 61 is arranged outside the door 200, which helps to improve the security performance of the lock 100.

In an embodiment, the password assembly 61 includes a first button 611. The first button 611 is pressed or touched to trigger a locking program on the circuit board 50 to control the motor 13 to execute the locking action, which helps to improve the intelligent level of the lock 100.

In an embodiment, the lock 100 further includes a fingerprint assembly 62 connected to the circuit board 50. A correct fingerprint is input by the fingerprint assembly 62 to trigger a corresponding control program on the circuit board 50 to execute the unlocking or locking action.

In an embodiment, the fingerprint assembly 62 is arranged outside the door 200, which helps to improve the security performance of the lock 100.

In an embodiment, the lock 100 further includes a card swiping assembly 64 connected to the circuit board 50. A correct card gets close to a sensing area of the card swiping assembly 64 to trigger a corresponding control program on the circuit board 50 to execute the unlocking or locking action.

In an embodiment, the lock 100 further includes a Bluetooth assembly (not shown in figure) connected to the circuit board 50. A correct wireless Bluetooth wire gets close to a receiving area of the Bluetooth assembly to trigger a corresponding control program on the circuit board 50 to execute the unlocking or locking action. In an embodiment, the Bluetooth assembly is arranged on the circuit board 50.

In an embodiment, the lock 100 further includes a communication assembly (not shown in figure) connected to the circuit board 50. A relevant instruction is sent to the communication assembly through a terminal such as a mobile phone to trigger a corresponding control program on the circuit board 50 to execute the unlocking or locking action. In an embodiment, the terminal such as the mobile phone sends the instruction through an APP. In an embodiment, the communication assembly is arranged on the circuit board 50.

In an embodiment, the lock 100 further includes a second button 63 arranged in the door 200. The second button 63 is pressed or touched to trigger the locking or unlocking program on the circuit board 50 to control the motor 13 to execute the locking or unlocking action, which helps to improve the intelligent level of the lock 100.

In an embodiment, when the user successfully opens the door 200 to enter the room and closes the door 200, the user presses or touches the second button 63, the circuit board 50 controls the motor 13 to execute the locking action, and the dead bolt 20 extends.

In an embodiment, when the lock 100 is in the closed state and the third gear 1112 is in the second position, the user presses or touches the second button 63 indoors, the circuit board 50 controls the motor 13 to execute the unlocking action, and the dead bolt 20 retracts.

In an embodiment, the lock 100 further includes a battery assembly 80 connected to the motor 13 and the circuit board 50 and configured to provide electrical energy for the motor 13 and the circuit board 50.

In an embodiment, the lock 100 further includes a second housing 70, the power device 10 and the battery assembly 80 are located in the second housing 70, the knob 30 is rotatably connected to the second housing 70, and part of the second button 63 is exposed to the second housing 70.

As shown in FIG. 12, FIG. 13, FIG. 20, and FIG. 21, in an embodiment, the second limit element 125 further includes a detection part 1257 arranged at the first part 1251.

In an embodiment, the first housing 15 is provided with second through holes 151.

When the guards 123 are in the first state, the bulges 1231 of the guards 123 are located in the second grooves 1222, the power device 10 is in the state of transmission connection, and a distance from the second through holes 151 to a center of the spindle 14 is substantially equal to a distance from a center of the detection part 1257 to the spindle 14. In this case, the fourth gear 122 and the second limit element 125 rotate synchronously, and the detection part 1257 can move to a position overlapping with the second through holes 151 so as to be exposed to the second through holes 151.

The lock 100 further includes first sensors 51 connected to the circuit board 50 and configured to detect an angular position of the detection part 1257. In an assembled state, the first sensors 51 and the second through holes 151 are arranged oppositely along the axial direction of the spindle 14.

When the power device 10 is in the state of transmission connection, the fourth gear 122 and the second limit element 125 rotate synchronously, the detection part 1257 can move to the position overlapping with the second through holes 151, and the first sensors 51 can sense the detection part 1257 through the second through holes 151, such that the circuit board 50 acquires the angular position of the detection part 1257 and can determine a rotation angle of the fourth gear 122 to determine whether the action executed by the power device 10 is the unlocking action or the closing action, thereby improving the intelligent level of the lock 100. In an embodiment, the first sensors 51 are arranged on the circuit board 50.

In an embodiment, the first housing 15 is provided with the three second through holes 151 arranged along the circumferential direction of the spindle 14, and an angle between connecting lines from centers of the two adjacent second through holes 151 to the center of the spindle 14 is approximately 90°.

The lock 100 includes the three first sensors 51. In the assembled state, the three first sensors 51 are corresponding to the three second through holes 151, respectively. When the detection part 1257 rotates to an area of a second through hole 151, the first sensor 51 corresponding to the second through hole 151 can detect the detection part 1257, such that the circuit board 50 determines the rotation angle of the fourth gear 122 to determine whether the action executed by the power device 10 is the unlocking action or the locking action.

In an embodiment, the first sensors 51 are photoelectric detection switches.

In an embodiment, the lock 100 further includes a magnetic element 127 arranged on the detection part 1257.

In an embodiment, the first housing 15 is further provided with third through holes 152.

When the guards 123 are in the second state, the end parts of the bulges 1231 of the guards 123 are in contact connection with the side wall of the first groove 1221, the power device 10 is in the state of no transmission connection, and a distance from the third through holes 152 to the center of the spindle 14 is substantially equal to a distance from a center of the magnetic element 127 to the spindle 14. In this case, the second limit element 125 rotates relative to the fourth gear 122, and the magnetic element 127 can move to a position overlapping with the third through holes 152 so as to be exposed to the third through holes 152.

The lock 100 further includes second sensors 52 arranged on the circuit board 50 and configured to detect an angular position of the magnetic element 127.

When the power device 10 is in the state of no transmission connection, the second limit element 125 rotates relative to the fourth gear 122, and the second sensor 52 can sense the magnetic element 127 through the third through holes 152, such that the circuit board 50 obtains information on mechanical unlocking or locking at this time, thereby facilitating subsequent program control.

In an embodiment, the first housing 15 is provided with the two third through holes 152, and along the circumferential direction of the spindle 14, the two third through holes 152 are located on two sides of the first through hole 151 arranged in the center respectively and each located between the two adjacent first through holes 151.

The lock 100 includes the two second sensors 52. In the assembled state, the two second sensors 52 are corresponding to the two third through holes 152, respectively. When the magnetic element 127 rotates to an area of a third through hole 152, the second sensor 52 corresponding to the third through hole 152 can detect the detection part 127, such that the circuit board 50 obtains the information on the mechanical unlocking or locking at this time, and also can obtain whether the action is the unlocking action or the locking action at this time based on information transmitted by different second sensors 52, thereby facilitating the subsequent program control.

In an embodiment, the second sensors 52 are Hall sensors.

In an embodiment, the magnetic element 127 is a magnet.

In an embodiment, a center of each second through hole 151 or a center of each third through hole 152 refers to its geometric center. It can be understood that a distance from the center of each second through hole 151 to the center of the spindle 14 is greater than a distance from the center of each third through hole 152 to the center of the spindle 14.

In an embodiment, this application further provides a method for using the lock 100, applied to the lock 100 according to any one of the foregoing embodiments, and including the following steps:

- when the lock is automatically opened outside the door 200, the motor 13 rotating forwards, the third gear 1112 moving to the first position, the first gear 121 rotating along the first direction, and the dead bolt 20 retracting;
- when the lock is automatically closed in the door 200, the motor 13 rotating reversely, the third gear 1112 moving to the third position, the first gear 121 rotating along the second direction, and the dead bolt 20 extending; and
- when the third gear 1112 is in a free state, the motor 13 rotating forwards, and the third gear 1112 moving to the second position.

In an embodiment, the method for using the lock 100 further includes the following step:

- when the lock is automatically opened outside the door 200, the motor 13 rotating forwards, the third gear 1112 moving to the first position, the first gear 121 rotating along the first direction, and the dead bolt 20 retracting.

In an embodiment, the method for using the lock 100 further includes the following step:

- when the lock is manually opened outside the door 200, the third gear 1112 being in the second position, the spindle 14 rotating along the first direction, and the dead bolt 20 retracting.

In summary, according to the lock 100 in this application, the clutch assembly 111 of the first transmission assembly 11 has three states, which are corresponding states when the third gear 1112 is in the first position, the second position, and the third position, respectively; when the third gear 1112 is in the first or third position, the first transmission assembly 11 and the second transmission assembly 12 are in the state of transmission connection, and the dead bolt 20 is caused to retract or extend through the transmission, to implement unlocking or locking; and when the third gear 1112 is in the second position, the first transmission assembly 11 and the second transmission assembly 12 are in the state of no transmission connection. In this way, through the clutch function of the clutch assembly 111, the third gear 1112 is caused to be in the second position. When the user uses the mechanical key or turns the knob in the door to open the lock, the turning action of the user does not need to overcome the resistance force generated by the motor 13 and gear meshing, which can protect the motor 13, prolong the service life of the motor 13, reduce the impact of the service life of the motor 13 on the lock 100, facilitate the user to open the lock smoothly, and improve the usage experience of the user.

The above are only specific embodiments of this application, but the scope of protection of this application is not limited thereto. Any changes or substitutions within the technical scope of this application should all be included in the scope of this application.

What is claimed is:

1. A lock, comprising a first transmission assembly, a second transmission assembly, a motor, a spindle, and a dead bolt, wherein the second transmission assembly comprises a first gear arranged rotatably, and the spindle is connected to the first gear and the dead bolt;

- the first transmission assembly comprises a clutch assembly, the clutch assembly comprises a second gear, a third gear, and a connector, the connector connects the second gear to the third gear, and the second gear is in meshed connection with the third gear;
- the motor is connected to the second gear and configured to drive the second gear to rotate, and the second gear is configured to drive the third gear to rotate;
- the third gear has a first position, a second position, and a third position in respect to the first gear;
- when the third gear is in the first position, the third gear is in meshed connection with the first gear, the third gear is configured to drive the first gear to rotate along a first direction, the first gear drives the spindle to rotate, and the spindle drives the dead bolt to move and retract;
- when the third gear is in the second position, the third gear is separated from the first gear; and
- when the third gear is in the third position, the third gear is in meshed connection with the first gear, the third gear is configured to drive the first gear to rotate along a second direction, the first gear drives the spindle to rotate, and the spindle drives the dead bolt to move and extend, wherein the second direction is opposite to the first direction;
- the clutch assembly further comprises a first shaft connected to the third gear and the connector, and the third gear is configured to rotate about an axis of the first shaft;
- the first shaft comprises an excess part located on one side of the connector that faces away from the third gear; and
- the first transmission assembly further comprises a first limit element connected to the excess part and the connector.

2. The lock according to claim 1, wherein

- the first shaft comprises a flange located on one side of the third gear that faces away from the connector and connected to the third gear; and the clutch assembly further comprises a first elastic element arranged between the connector and the third gear and connected to the connector and the third gear.

3. The lock according to claim 1, wherein the third gear is configured to drive the first shaft to rotate synchronously.

4. The lock according to claim 1, wherein the first shaft is fixedly connected to the connector.

5. The lock according to claim 1, wherein the clutch assembly further comprises a second shaft connected to the second gear and the connector, and the second gear is configured to rotate about an axis of the second shaft.

6. The lock according to claim 1, wherein the second transmission assembly further comprises:

a fourth gear arranged rotatably and connected to the first gear, wherein the fourth gear is provided with a first groove and second grooves, the first groove is concavely arranged along an axial direction of the fourth gear, and the second grooves communicate with the first groove and are concavely arranged along a diameter direction of the fourth gear and a direction away from an axis of the fourth gear, wherein the axial direction of the fourth gear coincides with an axial direction of the spindle;

guards arranged in the first groove and connected to the spindle and the fourth gear, wherein each of the guards comprises a bulge arranged in a manner of extending along the diameter direction of the fourth gear and the direction away from the axis of the fourth gear; and second elastic elements connected to the guards;

wherein the guards have a first state and a second state in respect to the fourth gear;

when the guards are in the first state, the bulges are located in the second grooves, and the fourth gear, the guards, and the spindle are configured to rotate about the axis of the fourth gear; and when the guards are in the second state, the bulges are separated from the second grooves and connected to a side wall of the first groove, the second elastic elements are in a compressed deformation state, and the guards and the spindle are configured to rotate relative to the fourth gear.

7. The lock according to claim 6, wherein the fourth gear is provided with the plurality of second grooves arranged along a circumferential direction of the fourth gear; and the second transmission assembly comprises the two guards and the two second elastic elements, the two guards are symmetrically arranged with the axis of the fourth gear as a center, each of the two second elastic elements is connected to the two guards, and the two second elastic elements are symmetrically arranged with the axis of the fourth gear as the center.

8. The lock according to claim 6, wherein each of the guards further comprises a base, the bulge is arranged on the base, and the bases are connected to the second elastic elements;

the second transmission assembly further comprises a second limit element, and the second limit element comprises a first part and second parts connected to each other;

the bases are located between the first part and a bottom wall of the first groove along the axial direction of the fourth gear; and the second parts are located between the bases and the side wall of the first groove along the diameter direction of the fourth gear.

9. The lock according to claim 8, wherein the second limit element comprises the plurality of second parts arranged along the circumferential direction of the fourth gear, and a gap is provided between adjacent two of the plurality of second parts; and at least part of the bulge is located in the gap.

10. The lock according to claim 8, wherein the second limit element further comprises guide parts arranged at the first part and connected to the guards.

11. The lock according to claim 8, wherein the second limit element is provided with a first through hole; and the spindle comprises a first limit part located in the first through hole and connected to a side wall of the first through hole, and the first limit part and the first through hole are configured to cause the spindle and the second limit element to rotate synchronously.

12. The lock according to claim 8, wherein the second limit element further comprises a detection part arranged at the first part; and the lock further comprises a sensor configured to monitor an angular position of the detection part.

13. The lock according to claim 1, further comprising:

a knob connected to the spindle and configured to drive the spindle to rotate; and a lock cylinder assembly connected to the spindle and configured to be inserted with a key and drive the spindle to rotate;

wherein the lock cylinder assembly and the knob are located at two ends of the lock respectively along the axial direction of the spindle.

14. The lock according to claim 1, further comprising:

a circuit board connected to the motor and configured to control the motor; and a password assembly connected to the circuit board.

15. The lock according to claim 14, further comprising a fingerprint assembly connected to the circuit board.

16. The lock according to claim 14, further comprising a card swiping assembly connected to the circuit board.

17. The lock according to claim 14, further comprising a Bluetooth assembly connected to the circuit board.

18. The lock according to claim 14, further comprising a communication assembly connected to the circuit board.

* * * * *